(12) United States Patent
Kasyanova et al.

(10) Patent No.: US 9,360,596 B2
(45) Date of Patent: Jun. 7, 2016

(54) DEPOSITING POLYMER SOLUTIONS TO FORM OPTICAL DEVICES

(71) Applicant: Light Polymers Holding, George Town (KY)

(72) Inventors: Irina Kasyanova, South San Francisco, CA (US); Mary Parent, South San Francisco, CA (US); Evgeni Poliakov, South San Francisco, CA (US); Valery Kuzmin, South San Francisco, CA (US)

(73) Assignee: LIGHT POLYMERS HOLDING (KY)

( * ) Notice: Subject to any disclaimer, the term of this patent is extended or adjusted under 35 U.S.C. 154(b) by 0 days.

(21) Appl. No.: 13/869,041

(22) Filed: Apr. 24, 2013

(65) Prior Publication Data
US 2014/0322452 A1    Oct. 30, 2014

(51) Int. Cl.
| | |
|---|---|
| *G02B 1/12* | (2006.01) |
| *G02B 1/04* | (2006.01) |
| *C09K 19/38* | (2006.01) |
| *C09K 19/04* | (2006.01) |

(Continued)

(52) U.S. Cl.
CPC .............. *G02B 1/12* (2013.01); *C09K 19/0403* (2013.01); *C09K 19/3809* (2013.01); *G02B 1/04* (2013.01); *G02B 5/045* (2013.01); *G02B 5/3083* (2013.01)

(58) Field of Classification Search
CPC ........... C09K 19/04; C09K 19/22; C08J 7/18; G02B 1/04; G02B 1/10
USPC ............................ 427/162, 506, 520; 524/606
See application file for complete search history.

(56) References Cited

U.S. PATENT DOCUMENTS

| 5,067,797 A | 11/1991 | Yokokura et al. |
|---|---|---|
| 5,739,296 A | 4/1998 | Gvon et al. |

(Continued)

FOREIGN PATENT DOCUMENTS

| EP | 0489951 A1 | 6/1992 |
|---|---|---|
| JP | 2010-091984 A | 4/2010 |

(Continued)

OTHER PUBLICATIONS

Koo et al., "Preparation and humidity-sensitive properties of novel photocurable sulfonated polyimides," *Macromolecular Research*, Dec. 1, 2012, 20(12):1226-1233.

(Continued)

*Primary Examiner* — Elena T Lightfoot
(74) *Attorney, Agent, or Firm* — Mueting, Raasch & Gebhardt, P.A.

(57) ABSTRACT

Provided are methods of depositing polymer solutions on substrates to form various optical elements. A polymer solution may include about 0.1%-30% by weight of a specific polymer having rigid rod-like molecules. The molecules may include various cores, spacers, and sides groups to ensure their solubility, viscosity, and cross-linking ability. The deposition techniques may include slot die, spray, molding, roll coating, and so forth. Pre-deposition techniques may be used to improve wettability and adhesion of substrates. Post-deposition techniques may include ultraviolet cross-linking, specific drying techniques, evaporation of solvent, treating with salt solutions, and shaping. The disclosed polymers and deposition processes may yield optical elements with high refractive index values, such as greater than 1.6. These optical elements may be used as +A plates, −C plates, or biaxial polymers and used as retarders in LCD active panels or as light collimators and light guides.

10 Claims, 11 Drawing Sheets

(51) Int. Cl.
  *G02B 5/30* (2006.01)
  *G02B 5/04* (2006.01)

(56) References Cited

U.S. PATENT DOCUMENTS

| | | | |
|---|---|---|---|
| 6,049,428 A | 4/2000 | Khan et al. |
| 6,174,394 B1 | 1/2001 | Gvon et al. |
| 6,399,166 B1 | 6/2002 | Khan et al. |
| 6,563,640 B1 | 5/2003 | Ignatov et al. |
| 6,583,284 B1 | 6/2003 | Sidorenko et al. |
| 6,619,553 B1 | 9/2003 | Bobrov et al. |
| 6,841,320 B2 | 1/2005 | Lazarev et al. |
| 6,846,522 B1 | 1/2005 | Bobrov et al. |
| 6,847,420 B2 | 1/2005 | Lazarev et al. |
| 6,848,897 B2 | 2/2005 | Lazarev et al. |
| 6,876,806 B2 | 4/2005 | Lazarev et al. |
| 6,913,783 B2 | 7/2005 | Lazarev et al. |
| 6,942,925 B1 | 9/2005 | Lazarev et al. |
| 6,962,734 B2 | 11/2005 | Nazarov et al. |
| 7,015,990 B2 | 3/2006 | Yeh et al. |
| 7,025,900 B2 | 4/2006 | Sidorenko et al. |
| 7,026,019 B2 | 4/2006 | Dutova et al. |
| 7,031,053 B2 | 4/2006 | Bobrov et al. |
| 7,042,612 B2 | 5/2006 | Lazarev et al. |
| 7,045,177 B2 | 5/2006 | Dutova et al. |
| 7,053,970 B2 | 5/2006 | Lazarev |
| 7,084,939 B2 | 8/2006 | Paukshto et al. |
| 7,106,398 B2 | 9/2006 | Bobrov |
| 7,108,749 B2 | 9/2006 | Bobrov |
| 7,110,177 B2 | 9/2006 | Sugino et al. |
| 7,113,337 B2 | 9/2006 | Lazarev et al. |
| 7,132,138 B2 | 11/2006 | Lazarev |
| 7,144,608 B2 | 12/2006 | Paukshto et al. |
| 7,160,485 B2 | 1/2007 | Nazarov et al. |
| 7,166,161 B2 | 1/2007 | Lazarev et al. |
| 7,190,416 B2 | 3/2007 | Paukshto et al. |
| 7,204,938 B2 | 4/2007 | Lazarev |
| 7,211,824 B2 | 5/2007 | Lazarev |
| 7,267,849 B2 | 9/2007 | Lazarev et al. |
| 7,271,863 B2 | 9/2007 | Paukshto et al. |
| 7,291,223 B2 | 11/2007 | Lazarev |
| 7,297,209 B2 | 11/2007 | Lazarev et al. |
| 7,315,338 B2 | 1/2008 | Yeh et al. |
| 7,317,499 B2 | 1/2008 | Paukshto et al. |
| 7,324,181 B2 | 1/2008 | Lazarev et al. |
| 7,405,787 B2 | 7/2008 | Paukshto et al. |
| 7,450,194 B2 | 11/2008 | Lazarev |
| 7,456,915 B2 | 11/2008 | Lazarev et al. |
| 7,479,311 B2 | 1/2009 | Bobrov |
| 7,557,876 B2 | 7/2009 | Lazarev et al. |
| 7,651,738 B2 | 1/2010 | Grodsky et al. |
| 7,733,443 B2 | 6/2010 | Lazarev et al. |
| 7,850,868 B2 | 12/2010 | Matsuda et al. |
| 7,888,505 B2 | 2/2011 | Doutova et al. |
| 7,889,297 B2 | 2/2011 | Palto |
| 7,911,557 B2 | 3/2011 | Lazarev et al. |
| 8,081,270 B2 | 12/2011 | Lazarev |
| 8,142,863 B2 | 3/2012 | Palto |
| 8,168,082 B2 | 5/2012 | Matsuda et al. |
| 8,189,165 B2 | 5/2012 | Umemoto et al. |
| 8,257,802 B2 | 9/2012 | Inoue et al. |
| 8,416,376 B2 | 4/2013 | Palto |
| 8,512,824 B2 | 8/2013 | Kasianova et al. |
| 8,551,357 B2 | 10/2013 | Miyazaki et al. |
| 2009/0269591 A1 | 10/2009 | Kasianova et al. |
| 2010/0039705 A1 | 2/2010 | Doutova et al. |
| 2010/0149471 A1 | 6/2010 | Palto |
| 2010/0190015 A1 | 7/2010 | Kasianova |
| 2010/0215954 A1 | 8/2010 | Kuzmin et al. |
| 2011/0149393 A1 | 6/2011 | Nokel et al. |
| 2012/0013982 A1 | 1/2012 | Kharatiyan |
| 2012/0081784 A1 | 4/2012 | Lazarev |
| 2012/0099052 A1 | 4/2012 | Lazarev |
| 2012/0113380 A1 | 5/2012 | Geivandov et al. |
| 2013/0003178 A1 | 1/2013 | Lazarev |
| 2013/0251947 A1 | 9/2013 | Lazarev |
| 2014/0133177 A1 | 5/2014 | Miller et al. |
| 2014/0186637 A1 | 7/2014 | Kasianova et al. |
| 2014/0350214 A1 | 11/2014 | Kharatiyan |

FOREIGN PATENT DOCUMENTS

| | | |
|---|---|---|
| WO | 2010064194 A1 | 6/2010 |
| WO | 2012007923 A1 | 1/2012 |
| WO | 2013/119922 A1 | 8/2013 |

OTHER PUBLICATIONS

International Search Report (PCT/ISA/210) / Written Opinion (PCT/ISA/237), mailed Jun. 25, 2014, in Patent Application No. PCT/IB2014/059487, filed Mar. 6, 2014; 13 pgs.

Gribkova "Chemical synthesis of polyaniline in the presence of poly(amidosulfonic acids) with different rigidity of the polymer chain," Apr. 2011, *Polymer* 52(12):2474-2484.

Konoshchuk, "Physicochemical Properties of Chemically and Mechanochemically Prepared Interpolymer Complexes of Poly(3,4-Ethylenedioxythiophene) with Polyamidosulfonate Dopants," Jan. 2014, *Theoretical and Experimental Chemistry* 50(1): 21-28 (Russian Original, Jan. 2014).

DEPOSITING POLYMER SOLUTIONS TO FORM OPTICAL DEVICES

TECHNICAL FIELD

The present disclosure relates generally to the field of organic chemistry, and more particularly to methods of forming various optical elements using various birefringent films.

DESCRIPTION OF RELATED ART

Optical polymers have specific characteristics, such as relatively high and/or anisotropic refractive index, that make these polymers suitable for various optical applications. For example, glass-type, poly-methyl methacrylate (PMMA) and polystyrene have been used as fiber optics core materials, backlight applications of LCDs, plastic lenses and films, while silicon resins and silica have been used as fiber claddings. However, the refractive index of PMMA is about 1.49, while the refractive index of polystyrene is about 1.59. These values may not be sufficient to harness the light, and many researches strive to develop polymers with higher refractive index values to reduce working distances and achieve better geometry of optical elements by invoking "faster (high-refractive index) optics." Another example application is liquid crystal displays (LCDs), which utilize optically anisotropic birefringent films, particularly in polarizing stacks, or achieving programmable retardation in three-dimensional applications. Such polymer films may be made from various polymer materials that may acquire optical anisotropy through uniaxial or biaxial intrinsic birefringence of material refractive indexes or their extension through polymer alignment techniques. For example, triacetyl cellulose (TAC) may be used as weak negative C plates with low intrinsic values of birefringence. Another example is making retardation films from cyclo olefin polymer (COP) by stretching. Other examples for producing optical elements may also include the use of polycarbonate, polymethylmethacrylate (PMMA), and polyamide. These polymers may be used as orientation films or light guides in LCDs or other optical devices. Polyethylene Terephthalate (PET) and Poly Carbonate (PC) based optical elements may have very intrinsic birefringence, which makes them difficult substrates to stretch to make a stretched retarder similar to TAC unless special alignment techniques are applied. Furthermore, new inexpensive yet controlled processing techniques are highly desirable. Many existing polymers are difficult to process, and some processing techniques may negatively impact optical characteristics of polymers. For example, using temperature gradients makes thermotropic crystals, also used as retarders, however, the alignment is done in predetermined fashion by rubbing polyamide structures in certain direction, adding processing cost and manufacturing steps. It becomes even more important since screen size is continuously growing, and stretched films of larger size are harder to process

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are methods of depositing polymer solutions to form various optical elements. A solution may include between about 0.1% and 30% by weight of a specific polymer having rigid rod-like molecules. The molecules may include various cores, spacers, and side groups to ensure their solubility, viscosity, cross-linking ability, and other related processing properties. The deposition techniques may involve slot die coating, spray coating, molding at various temperatures, roll-to-roll coating, Mayer rod coating, extrusion, casting, embossing, and many more. Various pre-deposition and post-deposition techniques may be employed. At least some pre-deposition techniques may be employed to improve wettability and adhesion to a substrate on which the polymer solution is deposited. Some examples of pre-deposition techniques may include saponification, cleaning, oxidizing, leaching, corona or plasma treatment, depositing a primer layer, and so forth. At least some post-deposition techniques may include ultraviolet (UV) radiation, infrared (IR) radiation, cross-linking of chemical compounds with a substrate, specific drying techniques, evaporation of solvent, treating with salt solutions, and structure-form shaping. The specifically designed polymers and deposition processes may yield optical elements with high refractive index values, such as greater than 1.6 or even greater than 1.7 within a portion of the visible range. These optical elements may be used as positive A plates, negative C plates, or biaxial plates and used, for example, as retarders in LCD active panels or as light collimators and light guides in backlight stack applications. Other applications, such as lenses and optical security films, are also within the scope of the present disclosure.

According to various aspects of the present disclosure, the polymer solution includes a solvent and a polymer. The polymer comprises n organic units having the following general structural formula:

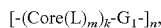

where the organic units comprise rigid conjugated organic component Core, wherein G is a spacer selected from the group consisting of —C(O)—NR1—, =(C(O))2=N—, —O—NR1—, linear and branched (C1-C4) alkylenes, —CR1R2-O—C(O)—CR1R2-, —C(O)—O—, —O—, and —NR1—, where R1 and R2 are independently selected from the group consisting of H, alkyl, alkenyl, alkynyl, and aryl; wherein L are lyophilic side-groups providing solubility to the polymer in the solvent and which are the same or different and independently selected from the group consisting of —COOX-13,—SO$_3$X, wherein X is selected from the group consisting of H, alkyl, alkenyl, alkynyl, aryl, alkali metal, and NW$_4$, where W is H or alkyl or any combination thereof, —SO$_2$NP1P2 and —CONP1P2, wherein P1 and P2 are independently selected from the group consisting of H, alkyl, alkenyl, alkynyl, and aryl; and where m is 0, 1, 2, or 3, and wherein k is 1, 2, or 3. In certain embodiments, these n organic units may be terminated with any suitable UV-curable elements such as alkenyl, alkynyl, acrylic, and the like. Cores, spacers and L-groups can be selected independently.

The solvent may comprise one or more of the following: polar protic solvent, polar aprotic solvent, and non-polar solvent. More specifically, the solvent may comprise one or more of the following: water, ketones, binary ketone/alcohol mixtures, hydroxyketones, tetrahydrofuran (THF), methyl acetate (MA), MIBK. In various embodiments, the polymer solution may include one or more additives such as nonylphenoxypoly glycidol, alcohols, acids, plasticizing agents, stabilizers, antioxidants, and hindered phenol. In further example embodiments of the present disclosure, the method steps may be implemented using various systems, devices, and mechanisms. Other features, examples, and embodiments are described below.

BRIEF DESCRIPTION OF THE DRAWINGS

Embodiments are illustrated by way of example, and not by limitation in the figures of the accompanying drawings, in which like references indicate similar elements and in which.

DETAILED DESCRIPTION OF EXAMPLE EMBODIMENTS

Figure 1:
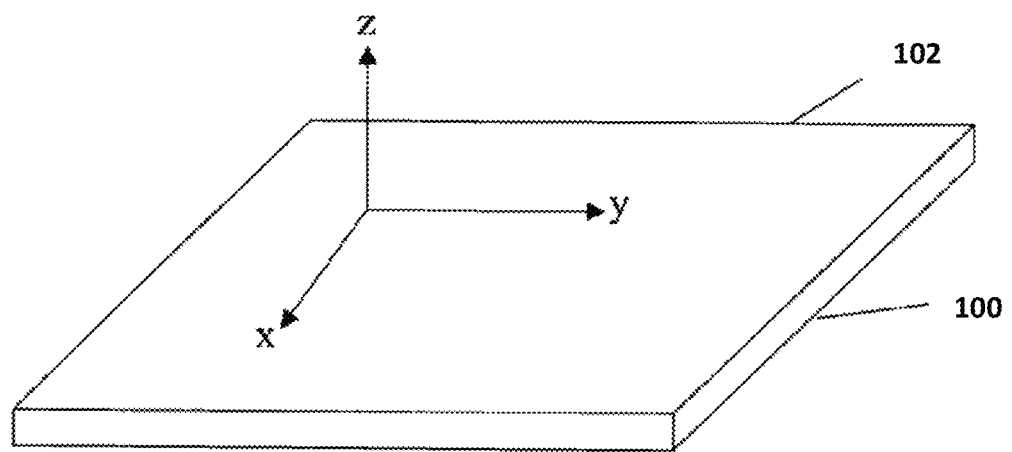
FIG. 1 is a high level illustration of a coordinate system associated with an optical element.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

Polymers can be used to fabricate various optical elements, such as plastic optical fibers, optical coatings, lenses, retarders, polarizers, light collimators, light guides, optical films (diffusers, collimating structures, light enhancement films, anti-glare and anti-reflection structures), illuminators, and many other types of devices. However, such applications require specific optical characteristics and, in many cases, specific processing characteristics and very few polymers have sufficiently high values of refractive index and/or birefringence. For example, optically anisotropic birefringent films may be used in liquid crystal displays (LCDs) or other backlight stack applications, such as retarders, optical films, collimators, optical films, illuminators, light boxes, light guides, light collimators, and so forth. These films may be optimized for the optical characteristics of each individual LCD type. The films may acquire optical anisotropy through uniaxial and biaxial extension, shear stresses exerted on the polymers, casting and molding and other suitable techniques. For example, TAC, PC, PMMA, polyamide, and cyclo olefin polymer (COP), may be used to fabricate positive A, negative C, and Ac plates for LCDs or other optical elements. Another polymer alignment technique utilizes thermotropic liquid crystal polymers and involves heating above its phase transition point in combination with electric field application or using pre-stretched or rubbed substrate to provide required alignment.

As noted above, many conventional optical films are produced by stretching to achieve certain characteristics. Stretching introduces various stresses and damages into these conventional films and negatively affects their performance. In addition, it may be difficult to stretch in two orthogonal directions (often required to obtain the necessary performance for a LCD stack). Larger display formats introduce another degree of complexity and quality requirements. The methods described herein deposit different kinds of optical films that do not need to be stretched, or thermo-processed to achieve orientation and, as a result, are substantially free from stresses and damages when integrated into an optical element, such as an LCD. In contrast to conventional methods, orientation of polymer molecules in these films may be achieved during the deposit process as the molecules are aligned by shear stresses.

According to one or more embodiments of the present disclosure, deposition methods use polymer solutions to form various optical elements. Applicable polymer solution may include between about 0.1% and 30% or even between 1% and 10% by weight of a specific polymer having rigid rod-like molecules. Solvents used in the polymer solutions may include a wide range of substances such as polar protic solvents, polar aprotic solvents, and non-polar solvents. The polymer molecules may have a chain length of between about 5,000 and 100,000 unified atomic mass units, however it should be noted that optimal chain lengths and molecular weight in general may depend on polymer concentration in polymer solution, viscosity, temperature and many other chemical and physical parameters of deposition and post-deposition processes. The size of polymer chains allows aligning the polymer molecules at least in the coating direction so as to achieve desired refractive indices for the optical element. As described below, positive A plates, negative C plates and biaxial polymers may be formed based at least in part on the orientation or stretching of polymer chains.

The polymer solutions may be deposited using the following techniques: slot die, spraying, molding, roll-to-roll coating, Mayer rod coating, roll coating, gravure coating, micro-gravure coating, comma coating, knife coating, extrusion, printing, dip coating, and so forth. For example, a slot die technique may involve forcing under pressure a polymer solution from a reservoir through a slot onto a moving substrate. The slot may have a much smaller cross-section than the reservoir and may be oriented perpendicularly to the direction of the substrate movement. A combination of the pressure, size of the slot width, gap between the slot and the substrate, and substrate moving speed as well as various polymer solution characteristics described above provide for specific orientation of the molecules (e.g., these parameters may define characteristics of a positive A plates).

The substrates used for polymer solution deposition may include a polymer substrate, glass substrate, TAC substrate, polypropylene substrate, polycarbonate substrate, PET, polyacrylic substrate, PMMA substrate, and so forth. The substrates may be treated using one or more techniques prior to deposition of the polymer solution so as to improve wettability and/or adhesion of the polymer solution deposited onto the substrate. In particular, the treating techniques may include one or more of the following: cleaning (e.g., ultrasound cleaning), leaching and/or oxidizing using mildly alkaline water solution, saponification, depositing a primer layer (e.g., silane or polyethyleneimine), and modifying surface relief of the substrate by subjecting it to corona discharge or plasma discharge utilizing various gases and vapors, electron or ion beam. The pre-deposition techniques may also include addition of additives to the polymer solutions. The additives may include plasticizing agents, antioxidants, surfactants, formability agents, stabilizers, nonylphenoxypoly glycidol, alcohols, acids, and hindered phenol or other low molecular weight materials and polymers.

In general, the polymer solutions may be isotropic prior to deposition and have no preferred direction for molecule orientation. However, various post-deposition techniques may be employed to achieve desired orientation of the molecules or specific optical properties. Post-deposition techniques may include, for example, ultraviolet (UV) cross-linking, specific drying techniques, techniques to evaporate solvents from polymer solutions, infrared (IR) light radiation, heating, subjecting to a drying gas flow, shaping, and so forth.

The specifically designed polymers and deposition processes may yield optical elements with high refractive index values, for example, greater than 1.6 or even greater than 1.7 within a portion of the visible range. These optical elements may be used, for example, as positive A plates, negative C plates, or biaxial polymers, and used, for example, as retarders in LCD active panels or as light collimators and light guides in backlight stack applications. Other applications, such as lenses and optical security films, are also within the scope of the present disclosure.

DEFINITIONS

The term a "visible spectral range" refers to a spectral range having the lower boundary of approximately 400 nm and the upper boundary of approximately 700 nm.

The term "retardation layer" refers to an optically anisotropic layer, which can alter the polarization state of a light wave traveling through the anisotropic layer and which is characterized by three principal refractive indices ($n_x$, $n_y$, and $n_z$) associated with Cartesian coordinate system related to the deposited polymer solution layer or the corresponding optical element based thereupon. Two principal directions for refractive indices $n_x$ and $n_y$ may belong to the xy-plane coinciding with a plane of the retardation layer, while one principal direction for refractive index ($n_z$) coincides with a normal line to the retardation layer. This is further illustrated in FIG. 1, which shows an optical element 100 as including a substrate with the deposited polymer solution and an axis system (e.g., Cartesian coordinate system) having orthogonal axes x, y and z. In various embodiments, at least two refractive indices among $n_x$, $n_y$, and $n_z$ have different values. The term "retardation layer" may also refer to an optical element that divides an incident monochromatic polarized light into components and introduces a relative retardation or phase shift between them.

The term "biaxial retardation layer" refers to an optical layer which has refractive indices $n_x$, $n_y$, and $n_z$ satisfying the following condition in the visible spectral range: $n_x \neq n_z$, $n_x \neq n_y$, and $n_x \neq n_z$.

The term "uniaxial retardation layer" refers to an optical layer with refractive indices satisfying the following condition in the visible spectral range: $n_x = n_y \neq n_z$, or $n_x \neq n_y = n_z$, or $n_x = n_z \neq n_y$.

The term "optically anisotropic retardation layer of Ac-plate type" refers to an optical layer which refractive indices $n_x$, $n_y$, and $n_z$ obey the following condition in the visible spectral range: $n_z < n_y < n_x$.

The term "optically anisotropic retardation layer of negative C-plate type" refers to an optical layer with refractive indices $n_x$, $n_y$, and $n_z$ satisfying the following condition in the visible spectral range: $n_z < n_x = n_y$.

The above definitions are invariant to rotation of system of coordinates (of the laboratory frame) about the vertical z-axis for all types of anisotropic layers.

The term "C-plate" may refer to a birefringent optical element, such as, for example, a plate or film, with a principle optical axis (often referred to as the "extraordinary axis") substantially perpendicular to the selected surface of the optical element. The principle optical axis corresponds to the axis along which the birefringent optical element has an index of refraction different from the substantially uniform index of refraction along directions normal to the principle optical axis. For example, a C-plate using the axis system illustrated in FIG. 1 with $n_x = n_y \neq n_z$, where $n_x$, $n_y$, and $n_z$ are the indices of refraction along the x, y, and z axes, respectively. The optical anisotropy is defined as $\Delta n_{zx} = n_z - n_x$. For purposes of simplicity, $\Delta n_{zx}$ will be reported as its absolute value.

The term "A-plate" denotes a birefringent optical element, such as, for example, a plate or film, having its principle optical axis within the x-y plane of the optical element. Positively birefringent a-plates can be fabricated using, for example, uniaxially stretched films of polymers such as, for example, polyvinyl alcohol, polynorbornene or polycarbonate, or uniaxially aligned films of nematic positive optical anisotropy liquid crystal polymer (LCP) materials. Negatively birefringent A-plates can be formed using uniaxially aligned films of negative optical anisotropy nematic LCP materials, including for example discotic compounds.

The term "biaxial retarder" may refer to a birefringent optical element, such as, for example, a plate or film, having different indices of refraction along all three axes (i.e., $n_x \neq n_y \neq n_z$). Biaxial retarders can be fabricated, for example, by biaxially orienting plastic films. In-plane retardation and out of plane retardation are parameters used to describe a biaxial retarder. As the in-plane retardation approaches zero, the biaxial retarder element behaves more like a C-plate. Generally, a biaxial retarder, as defined herein, has an in-plane retardation of at least 3 nm for 550 nm emitting light wavelength. Retarders with lower in-plane retardation are considered C-plates.

The term "polymer" should be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "polarization" refers to plane polarization, circular polarization, elliptical polarization, or any other nonrandom polarization state in which the electric vector of the beam of light does not change direction randomly, but either maintains a constant orientation or varies in a systematic manner. In the plane polarization, the electric vector remains in a single plane, while in circular or elliptical polarization, the electric vector of the beam of light rotates in a systematic manner.

The term "retardation or retardance" refers to the difference between two orthogonal indices of refraction times the thickness of the optical element.

The term "in-plane retardation" refers to the product of the difference between two orthogonal in-plane indices of refraction times the thickness of the optical element.

The term "out-of-plane retardation" refers to the product of the difference of the index of refraction along the thickness direction (z direction) of the optical element minus one in-plane index of refraction times the thickness of the optical element. Alternatively, this term refers to the product of the difference of the index of refraction along the thickness direction (z direction) of the optical element minus the average of two orthogonal in-plane indices of refraction times the thickness of the optical element. It is understood that the sign—positive or negative—of the out-of-plane retardation is important to the user. But for purposes of simplicity, only the absolute value of the out-of-plane retardation will be reported herein. It is understood that one skilled in the art will know when to use an optical element with positive or negative out-of-plane retardation. For example, it is generally understood that an oriented film comprising triacetyl cellulose will produce a negative c-plate when the in-plane indices of refraction are substantially equal and the index of refraction in the thickness direction is less than the in-plane indices. However, herein, the value of the out-of-plane retardation will be reported as a positive number.

The term "substantially non-absorbing" refers to the level of transmission of the optical element of at least 80 percent transmissive with respect to at least one polarization state of visible light, where the percent transmission is normalized to the intensity of the incident, optionally polarized light.

The term "substantially non-scattering" refers to the level of collimated or nearly collimated incident light that is transmitted through the optical element, being at least 80 percent transmissive for at least one polarization state of visible light within a cone angle of less than 30 degrees.

The term "j-retarder" refers to a film or sheet that is substantially non-absorbing and non-scattering for at least one polarization state of visible light, where at least two of the three orthogonal indices of refraction are unequal, and where the in-plane retardation is no more than 100 nm and the absolute value of the out-of-plane retardation is at least 50 nm.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Examples of Water Soluble Optical Polymers

Water soluble optical polymers described herein may include a chain of n subunits, each subunit having a general structure formula (I) as follows:

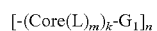

$$[-(Core(L)_m)_k-G_1]_n \quad (I)$$

The number n of subunits may be between about 5 and 50,000 or, more specifically, between 10 and 10,000. Those skilled in the art should understand that the number of subunits may define physical properties of optical elements based thereupon. For example, when the number of subunits is relatively small, the corresponding polymer chains may be too short to achieve a desired orientation. On the other hand, when the number of subunits is relatively high, the corresponding polymer chains may be too long and cause high viscosity and poor dissolving qualities associated with the polymer. In this regard, the number of subunits and the corresponding chain length may depend on selected organic components (Core), spacers (G), side-groups (L), desired orientation, and particular application.

In various embodiments, the organic components Core provide linearity and rigidity of the macromolecule associated with the organic polymer compound having formula (I). The sets of lyophilic side groups ($L_m$) and the number of the organic units n may control a ratio between mesogenic properties and viscosity of the polymer solution. The selection of organic components (Core), the lyophilic side-groups (L) and number of organic subunits n may determine the type and birefringence of the optical film.

In some embodiments, most of the organic units (e.g., more than 90%, more than 95%, or more than 99%) of the polymer are the same. However, in some embodiments, at least one organic subunit is different so that a copolymer may be formed.

Each subunit may include at least four conjugated organic components Core capable of forming a rigid rod-like macromolecule. These conjugated components may be individually selected from the following list of structural formulas (II) to (VIII):

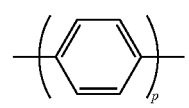
(II)

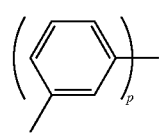
(III)

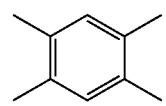
(IV)

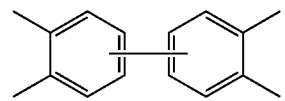
(V)

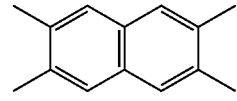
(VI)

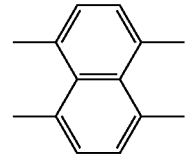
(VII)

-continued

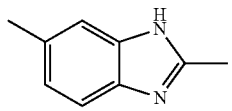
(VIII)

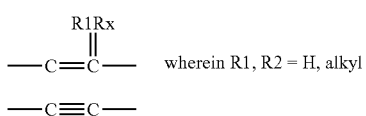
wherein R1, R2 = H, alkyl
(IX)

—C≡C—
(X)

where p is an integer equal to 1, 2, 3, 4, 5, or 6. It should be noted that components (II)-(X) may provide linearity and rigidity for the macromolecule while varying in structure.

In certain embodiments, organic components (Core) in each subunit may be of the same type. Alternatively, each organic subunit may include a Core of different type which, in turn, may alter optical properties of optical elements including such polymer compound. Those skilled in the art should understand that combining the organic components in subunits may affect specific optical properties for the optical element.

Further, each subunit may also include one or more spacers (G). Some examples of spacers are —C(O)—NR1—, =(C(O))$_2$=N—, —O—NR1—, linear and branched (C1-C4) alkylenes, —CR1R2-O—C(O)—CR1R2—, —C(O)—O—, —O—, and —NR1—, where R1 and R2 are independently selected from the group consisting of —H, alkyl, alkenyl, alkynyl, and aryl.

Further, each subunit may also include one or more lyophilic side-groups (L), which may include lyophilic groups providing solubility to the polymer or its salts in a suitable solvent. In some embodiments, one or more side groups may be hydrophilic groups, such as —COOX, —SO$_3$X, wherein X is selected from the group consisting of H, alkyl, alkenyl, alkynyl, aryl, alkali metal, and NW$_4$, wherein W is H or alkyl or any combination thereof, and —SO$_2$NP1P2 and —CONP1P2, where P1 and P2 are independently selected from the group consisting of H, alkyl, alkenyl, alkynyl, and aryl. In the formula (I), the total number of the side groups (m) is 0, 1, 2, or 3.

In various embodiments, said n organic units may include one or more termination components connecting to these n organic units according the following principle:

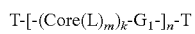

where T includes one or more of alkenyl, alkynyl, acrylic or any other UV-curable group.

A number of side groups as well as the number of organic units n may control the ratio between mesogenic properties and viscosity of the polymer. The selection of organic components (Core), the side-groups (L) and number of organic units (i.e., the value of n) determines the type and birefringence of the polymers and corresponding optical element based on the polymers. These polymers may be capable of forming solid optical retardation layers, such as a positive A-type retardation layer, a negative C-type retardation layer or Ac-type retardation layer, based on orientation or disorientation of the polymers and its components. For example, the conjugated component having formula (II) is linear in general, but the conjugated component having the formula (III) is disordered in general. Accordingly, if the subunit includes the conjugated components (II) only, the resulting polymer may form a negative C-type retardation layer. However, once the conjugated components (II) and (III) are combined in subunits, the resulting polymer may form an Ac-type retardation layer.

Molecules have to be rigid and long enough in order to provide ordering during drying. However both of these factors for polymers in aqueous solutions may lead to tendency of LLC formation. This effect is undesirable for one who wants to produce –C-plate. In order to suppress LLC formation one should add certain groups which decrease mesogenic properties, such as the following (but not limited to):

(a) introduction of chain-distorting (non-linear) fragments

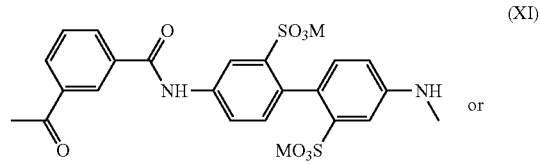
(XI)

or

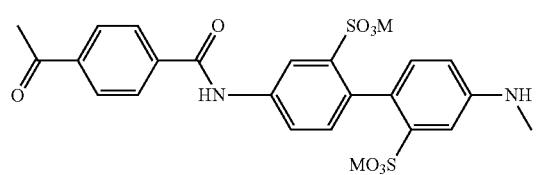
(XII)

or the following:

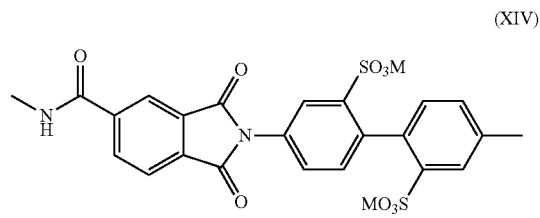
(XIV)

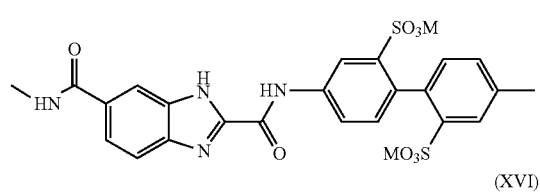
(XV)

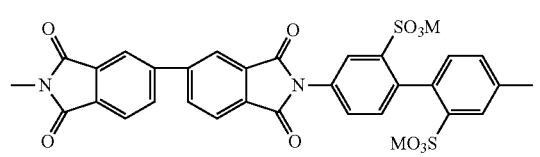
(XVI)

(b) introduction of large fragments, which sterically hinder interaction between chains:

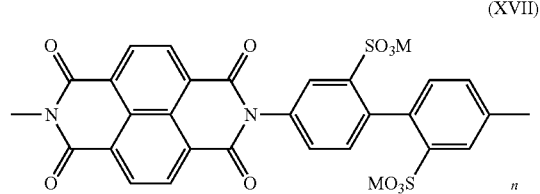
(XVII)

(c) introduction of side-groups, which sterically hinder interaction between chains:

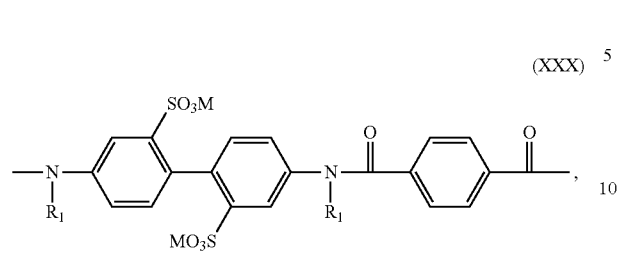

(XXX)

In some embodiments, a polymer may have a specific number of organic compounds and spacers. In other words, a monomer subunit forming the polymer may include, for example, two organic components, one of which has no side groups, while the other has two side groups. The first organic component (Core) may be represented by any of the formulas above, i.e., II (where p=1), III (where p=1), V, VII and VIII. The second organic component (Core) may be represented by the general formula II (where p=2). The side-group (L) may include sulfo-group $SO_3H$. The first spacer (G) may include C(O)—NH— or =2(C(O))=N—, while the second spacer (G) may include one of —C(O)—, —NH—C(O)—, —N=(C(O))2=. Examples of these polymers may include: poly(2,2'-disulfo-4,4'-benzidine terephthalamide), poly(2,2'-disulfo-4,4'-benzidine isophthalamide), poly(2,2'-disulfo-4,4'-benzidine 1,3-dioxo-isoindoline-5-carboxamide), poly(2,2'-disulfo-4,4'-benzidine 1H-benzimidazole-2,5-dicarboxamide), poly(2,2'-disulfo-4,4'-benzidine 3,3',4,4'-biphenyl tetracarboxylic acid diimide), and poly(2,2'disulfo-4,4'benzidine 1,4,5,8-naphtalene tetracarboxylic acid diimide). The corresponding structural formulas (XVIII)-(XXIII) of these polymers are shown below:

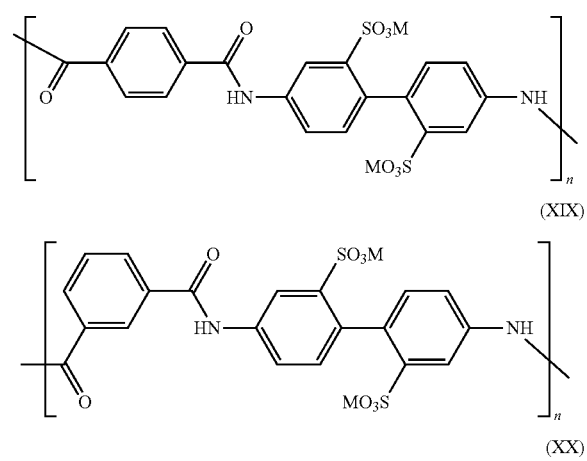

(XVII)

(XIX)

(XX)

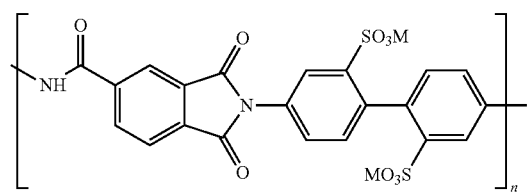

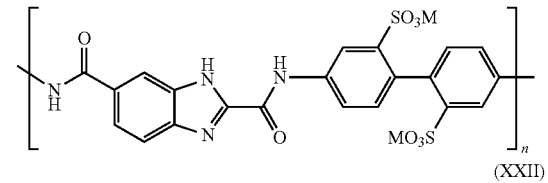

(XXI)

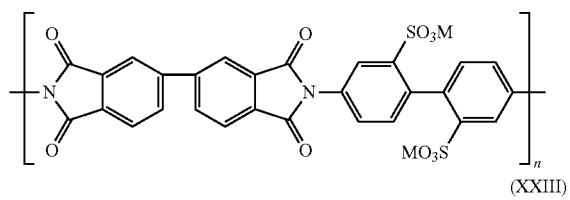

(XXII)

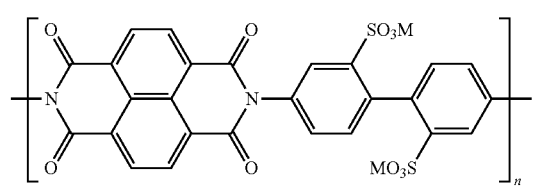

(XXIII)

where M is H and the number n may be between about 5 and 500,000.

In yet other embodiments, rigid rod-like macromolecules may be synthesized with n organic subunits of first type and k organic subunits of second type. In particular, the first type of organic subunits may include the following general structural formula (XXIV)

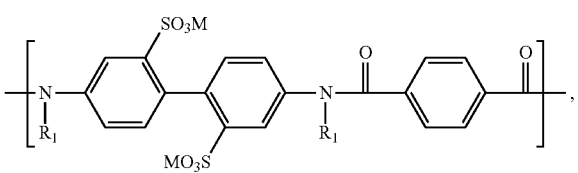

(XXIV)

while the second type of organic subunits may include the following general structural formula (XXV):

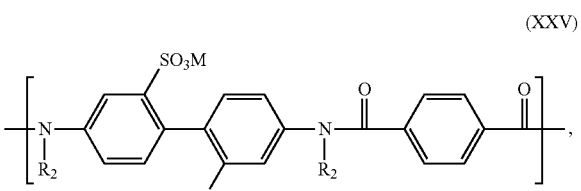

(XXV)

wherein n maybe in the range of 5 to 10,000, and k may be in the range of 5 to 10,000. $R_1$ and $R_2$ are side-groups that are independently selected from the group consisting of —H, alkyl, —(CH$_2$)$_m$SO$_3$M, —(CH$_2$)$_m$Si(O-alkyl)$_3$, —CH$_2$-aryl, and —(CH$_2$)$_m$OH, where m is a number from 1 to 18, and in the case of H as one of the side-groups, the total number of H should not exceed 50% of total number of side-groups ($R_1$ and $R_2$) in the macromolecule. M is a counterion selected from the group consisting of $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Al^{3+}$, $Ce3+$, $Y^{3+}$, $Yb^{3+}$, $Gd^{3+}$, $Zr^{4+}$ and $NH_{4-p}Q_p^+$, where Q is selected from the group consisting of linear and branched (C1-C20) alkyl, (C2-C20) alkenyl, (C2-C20) alkynyl, and (C6-C20) arylalkyl, and p is 0, 1, 2, 3 or 4. The organic units of the first type and the organic units of the second type are contained in the rigid rod-like macromolecules in an arbitrary sequence and may comprise polymerization of at least one aromatic diamine monomer having, for example, the following structural formula (XXVI):

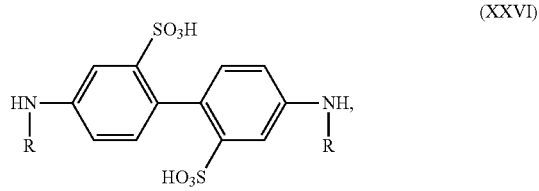

(XXVI)

where R is a side-group which is independently selected for different monomers from the group consisting of —H, alkyl, —$(CH_2)_mSO_3M$, —$(CH_2)_mSi(O\text{-alkyl})_3$, —$CH_2$—aryl, and $(CH_2)_mOH$, wherein m is a number from 1 to 18, and at least one difunctional electrophile monomer may have, for example, the following structural formula (XXVII):

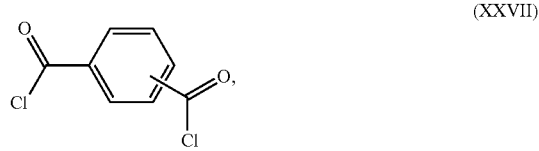

(XXVII)

an acid acceptor, and at least two solvents, wherein one solvent is water and another solvent is water-immiscible organic solvent, and wherein an optimal pH of polymerization step is approximately between 7 and 10.

In various embodiments, one or more salts of the organic polymer solution may be used, such as alkaline metal salts, ammonium, alkyl-substituted ammonium salts, alkenyl-substituted ammonium salts, alkinyl alkynyl-substituted ammonium salts, aryl-substituted ammonium salts.

In various embodiments, one or more salts of the organic polymer solution may be used, such as alkaline metal salts, ammonium, alkyl-substituted ammonium salts, alkenyl-substituted ammonium salts, alkinyl-substituted ammonium salts, aryl-substituted ammonium salts.

In various embodiments, the polymer used for coating and/or the resulting polymer structure may include one or more inorganic compounds such as hydroxides and salts of alkaline metals.

Solvents used for dissolving polymers may include water, any organic solvent, or any combination thereof.

Examples of Synthesizing Polymers

Reference is now made to the following examples, which are intended to be illustrative of various embodiments of the present disclosure, but are not intended to be limiting the scope.

Example 1

This example describes synthesis of poly(2,2'-disulfo-4,4'-benzidine isophthalamide) cesium salt (i.e., structure (XI)):

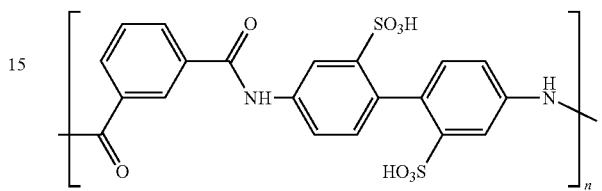

In particular, 1.377 g (0.004 mol) of 4,4'-diaminobiphenyl-2,2'-disulfonic acid was mixed with 1.2 g (0.008 mol) of Cesium hydroxide monohydrate and 40 ml of water and stirred with dispersing stirrer till dissolving 0.672 g (0.008 mol) of sodium bicarbonate was added to the solution and stirred. While stirring the obtained solution at high speed (2500 rpm) a solution of 0.812 g (0.004 mol) of isophthaloyl dichloride (IPC) in dried toluene (15 mL) was gradually added within 5 minutes. The stirring was continued for 5 more minutes, and viscous white emulsion was formed. Then the emulsion was diluted with 40 ml of water, and the stirring speed was reduced to 100 rpm. After the reaction mass has been homogenized the polymer was precipitated by adding 250 ml of acetone. Fibrous sediment was filtered and dried.

Weight average molar mass of the polymer samples was determined by gel permeation chromatography (GPC) analysis of the sample was performed with Hewlett Packard© (HP) 1050 chromatographic system. Eluent was monitored with diode array detector (DAD HP 1050 at 305 nm). The GPC measurements were performed with two columns TSKgel G5000 PWXL and G6000 PWXL in series (TOSOH Bioscience, Japan). The columns were thermostated at 40° C. The flow rate was 0.6 mL/min. Poly(sodium-p-styrenesulfonate) was used as GPC standard. Varian GPC software Cirrus 3.2 was used for calculation of calibration plot, weight-average molecular weight, Mw, number-average molecular weight, Mn, and polydispersity (D=Mw/Mn). The eluent was mixture of 0.1 M phosphate buffer (pH=7.0) and acetonitrile in the ratio 80/20, respectively. The Mw, Mn, and polydispersity (D) of polymer were 720 000, 80 000, and 9, respectively.

Example 2

Example 2 describes synthesis of 2,2'-disulfo-4,4'-benzidine terephthalamide-isophthalamide copolymer cesium salt (copolymer of structures (XI) and (XII)):

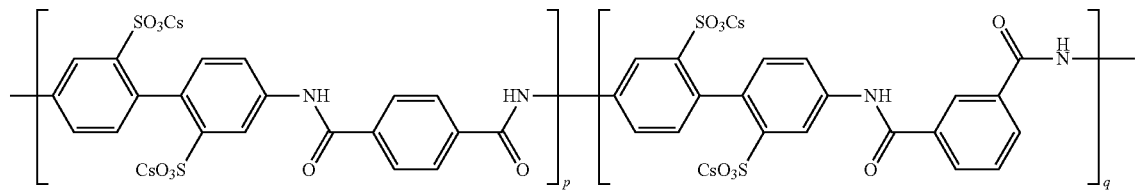

The same method of synthesis as in the Example 1 can be used for preparation of the copolymers of different molar ratio. In particular, 4.098 g (0.012 mol) of 4,4'-diaminobiphenyl-2,2'-disulfonic acid was mixed with 4.02 g (0.024 mol) of cesium hydroxide monohydrate in water (150 ml) in a 1 L beaker and stirred until the solid was completely dissolved. 3.91 g (0.012 mol) of sodium carbonate was added to the solution and stirred at room temperature until dissolved. Then toluene (25 ml) was added. Upon stirring the obtained solution at 7000 rpm, a solution of 2.41 g (0.012 mol) of terephthaloyl chloride (TPC) and 2.41 g (0.012 mol) of isophthaloyl chloride (IPC) in toluene (25 ml) were added. The resulting mixture thickened in about 3 minutes. The stirrer was stopped, 150 ml of ethanol was added, and the thickened mixture was crushed with the stirrer to form slurry suitable for filtration. The polymer was filtered and washed twice with 150-ml portions of 90% aqueous ethanol. Obtained polymer was dried at 75° C. The GPC molecular weight analysis of the sample was performed as described in Example 1.

Example 3

Example 3 describes synthesis of poly(2,2'disulpho-4,4' benzidine 1,4,5,8-naphtalene tetracarboxylic acid diimide) triethylammonium salt (i.e., the structure (XVII)):

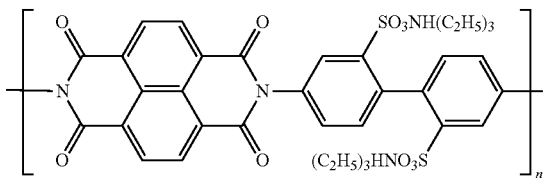

4.023 g (0.015 mol) of 1,4,5,8-naphtalene tetracarbonic acid dianhydride and 5.165 g (0.015 mol) of 2,2'-disulfobenzidine and 0.6 g of benzoic acid (catalyst) are charged into a three-neck flask equipped with an agitator and a capillary tube for argon purging. With argon flow turned on 40 ml of molten phenol is added to the flask. Then the flask is placed in a water bath at 80° C., and the content is agitated until homogeneous mixture is obtained. 4.6 ml of triethylamine is added to the mixture, and agitation is kept on for 1 hour to yield solution. Then temperature is raised successively to 100, 120, and 150° C. At 100 and 120 centigrade agitation is held for 1 hour at each temperature. During this procedure the solution keeps on getting thicker. Time of agitation at 150° C. is 4 to 6 hours.

The thickened solution is diluted with liquid phenol (mixture of water/phenol=1/10 by volume), until target consistency at 100° C. is obtained, and the resulting mixture is quenched with acetone. Weight average molar mass of the polymer samples was determined by GPC. The GPC analysis of the polymer samples was performed with Hewlett Packard 1050 HPLC system, and with the diode array detector (λ=380 nm). The chromatographic separation was done using OHpak SB-804 HQ column from Shodex. Mixture of dimethyl sulfoxide (DMSO) and dimethylformamide (DMF) in proportion of (75:25) respectively, with addition of 0.05M of lithium chloride (LiCl) was used as the mobile phase. Chromatographic data were collected and processed using the ChemStation B10.03 (Agilent Technologies) and GPC software Cirrus 3.2 (Varian). Poly(styrenesulfonic acid) sodium salt was used as a GPC standard. Before the GPC analysis all samples of the analyzed polymer and the standards were dissolved in DMSO in the concentration of approximately 1 mg/mL.

Example 4

Example 4 describes synthesis of poly(2,2'-disulfo-4,4'-benzidine 1,3-dioxo-isoindoline-5-carboxamide) cesium salt (i.e., the structure (XIV)).

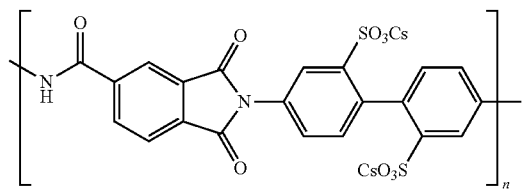

In particular, 2,5-Diaminobenzene-1,4-disulfonic acid (0.688 g, 2.0 mmol), anhydrous N-methylpyrrolidone (10 mL), triethylamine (0.86 mL) and trimellitic anhydride chloride (0.421 g, 2 mmol) were charged subsequently into a two-neck flask equipped with a magnetic stirrer, thermometer and air condenser with argon inlet. The reaction mixture was then heated up to approximately 130-140° C. and stirred for 24 hours. Then the reaction mixture was cooled to room temperature and the product was coagulated by slowly dripping the mixture into isopropanol with stirring by magnetic stirrer. The precipitate was collected by vacuum filtration and then suspended in methanol (50 mL) and filtered off. The brown solid was air dried for several hours and then vacuum dried at about 60° C. for 2 hours under $P_2O_5$ to constant weight 0.16 g.

Weight average molar mass of the polymer samples was determined by GPC. The GPC analysis of the polymer samples was performed with Hewlett Packard 1050 HPLC system, and with the diode array detector (λ=230 nm). The chromatographic separation was done using the TSKgel lyotropic G5000 PWXL column, (TOSOH Bioscience). Mixture of phosphate buffer 0.1 M (pH=6.9-7.0) and acetonitrile was used as the mobile phase. Chromatographic data were collected and processed using the ChemStation B10.03 (Agilent Technologies) and GPC software Cirrus 3.2 (Varian). Poly (styrenesulfonic acid) sodium salt was used as a GPC standard.

Example 5

This example describes synthesis of a rigid rod-like macromolecule of the general structural formula (XXX), where $R_1$ is $CH_3$, M is Cs and k is equal to n.

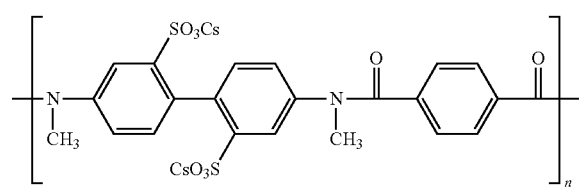

In particular, 30 g 4,4'-Diaminobiphenyl-2,2'-disulfonic acid was mixed with 300 ml pyridine. 60 ml of acetyl chloride was added to the mixture with stirring and the resulting reaction mass agitated for 2 hours at 35-45° C. Further, it was filtered, the filter cake was rinsed with 50 ml of pyridine and then washed with 1200 ml of ethanol. The obtained alcohol wet solid was dried at 60° C. Yield of 4,4'-bis(acetylamino) biphenyl-2,2'-disulfonic acid pyridinium salt is 95%.

12.6 g 4,4'-bis(acetylamino)biphenyl-2,2'-disulfonic acid pyridinium salt was mixed with 200 ml DMF. 3.4 g sodium hydride (60% dispersion in oil) was added. The reaction mass was agitated 16 hours at room temperature. 7.6 ml methyl iodide was added and the reaction mass was stirred 16 hours at room temperature. Then the volatile components of the reaction mixture were distilled off and the residue washed with 800 ml of acetone and dried. The obtained 4,4'-bis[acetyl (methyl)amino]biphenyl-2,2'-disulfonic acid was dissolved in 36 ml of 4M sodium hydroxide. 2 g activated charcoal was added to the solution and stirred at 80° C. for 2 hours. The liquid was clarified by filtration, neutralized with 35% HCl to pH-1 and reduced by evaporation to 30% by volume. Then it was refrigerated (5° C.) overnight and precipitated material isolated and dried. Yield of 4,4'-bis[methylamino]biphenyl-2,2'-disulfonic acid was 80%.

2.0 g 4,4'-bis[methylamino]biphenyl-2,2'-disulfonic acid and 4.2 g cesium hydrocarbonate were mixed with 6 ml water. This solution was stirred with IKA UltraTurrax T25 at 5000 rpm for 1 min. 2 ml triethylene glycol dimethyl ether was added, followed by 4.0 ml of toluene with stirring at 20000 rpm for 1 min. Then, solution of 1.2 g terephtaloyl chloride in 2.0 ml of toluene was added to the mixture at 20000 rpm. The emulsion of polymer was stirred for 60 min and then poured into 150 ml of ethanol at 20000 rpm. After 20 min of agitation the suspension of polymer was filtered on a Buchner funnel with a fiber filter, the resulting polymer dissolved in 8 ml of water, precipitated by pouring into of 50 ml of ethanol and dried 12 hours at 70° C. Yield was 2.3 g.

Example 6

Example 6 describes synthesis of UV-curable 2,2'-disulfo-4,4'-benzidine fumarylamide-isophthalamide copolymer sodium salt.

Examples of Optical Films

The polymers listed above can be used to form optical elements such as optical retarders, light collimators, light diffusers, light guides, optical fibers, lenses, LCD elements, optical security films, and various other optical films or components for optical elements or optical devices. Optical characteristics, such as refractive indices in each direction, are determined by types of polymers (e.g., their length and rigidity), orientation of the polymers, and other factors. Specifically, optical characteristics may be controlled by selection of organic components (Core), side-groups (L), and the number of subunits (i.e., the value of n). As described above, by selecting these components and parameters, one may produce positive A-plates, negative C-plates and Ac-plates. In some embodiments, the birefringence of the deposited film is at least about 0.05 or, more specifically, in between of about 0.05 and 0.20.

In an example, a polymer may be formed in a layer forming a plane in the X and Y directions. The X direction may be a coating direction. The layer may have a thickness in the Z direction. In some embodiments, the refractive index in the X direction (i.e., $n_x$) may be greater than the refractive indices in the Y and Z directions (i.e., $n_y$ and $n_z$). The refractive indices in the Y and Z directions (i.e., $n_y$ and $n_z$) may be the same. This type of films may be referred to a positive A-plate. The refractive index in the X direction (i.e., $n_x$) may be at least about 1.6, at least about 1.7, or even at least about 1.8. Very few conventional polymers have such high refractive indices. The refractive indices in the Y and Z directions (i.e., $n_y$ and $n_z$) may be at least about 1.4 or, more specifically, at least about 1.5. For example, polymers for positive A-plates have shown to have the refractive index in the X direction (i.e., $n_x$) of 1.85 and the refractive indices in the Y and Z directions (i.e., $n_y$ and $n_z$) of 1.57.

In some embodiments, the refractive index in the X direction (i.e., $n_x$) may be substantially the same as the refractive index in the Y direction (i.e., $n_y$) and greater than the refractive index in the Z direction (i.e., $n_z$). This type of films may be referred to as a negative C-plate. The refractive indices in the

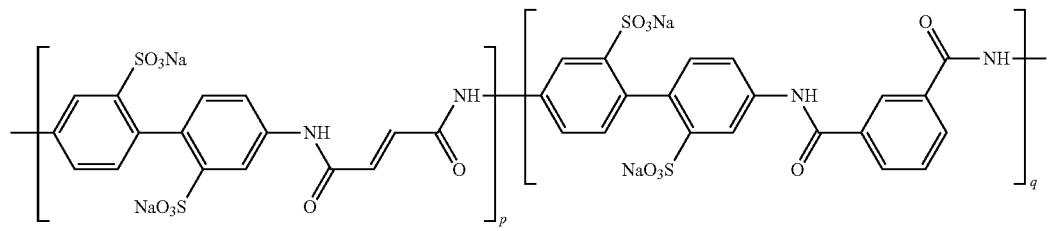

In particular, 15.0 g of 2,5-Diaminobenzene-1,4-disulfonic acid was mixed with 9.7 g of Sodium carbonate in 150 ml of water using a 2 L beaker and stirred until the solid was completely dissolved. Further, 350 ml of toluene was added. Upon stirring the obtained solution at 7000 rpm, a solution of 3.7 g of fumaryl chloride and 4.9 g of Isophthaloyl chloride in toluene (350 ml) was added. The resulting mixture was stirred for 3 hrs. The stirrer was stopped, 600 ml of Acetone was added, and the thickened mixture was crushed with the stirrer to form slurry suitable for filtration. The polymer was filtered and washed twice with 350-ml portions of Acetone. Obtained polymer was dried at 75° C. The GPC molecular weight analysis of the sample was performed as described in Example 1.

X and Y directions (i.e., $n_x$ and $n_y$) may be at least about 1.5, at least about 1.6, or even at least about 1.7, while the refractive index in the Z direction (i.e., $n_z$) may be at least about 1.5 or, more specifically, at least about 1.55. For example, polymers for negative C-plates have been shown to have refractive indices in the X and Y directions (i.e., $n_x$ and $n_y$) of 1.72 and the refractive index in the Z direction (i.e., $n_z$) of 1.59.

In some embodiments, the refractive index in the X direction (i.e., $n_x$) is less than the refractive indices in the Y and Z directions (i.e., $n_y$ and $n_z$). The refractive indices in the Y and Z directions (i.e., $n_y$ and $n_z$) may be different as well, e.g., the refractive index in the Y direction (i.e., $n_y$) being greater than the refractive index in the Z direction (i.e., $n_z$). This type of films may be referred to as biaxial film. The refractive index in the X direction (i.e., $n_x$) may be at least about 1.5 or, more specifically, at least about 1.55.

Overall, some polymer may be formed into a uniaxial retardation layer such that $n_z<n_x=n_y$. Other polymers may be formed into a biaxial retardation layer such that $n_z<n_y<n_x$.

Deposition Methods

Figure 2:
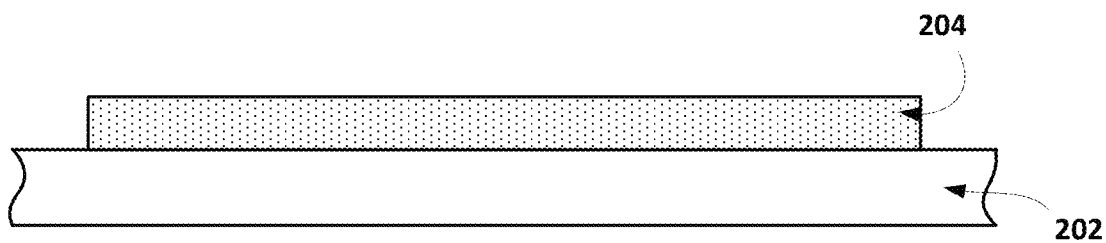
FIG. 2 is a high level illustration showing a substrate having one surface coated with a polymer film.

FIG. 2 is a high level illustration showing a substrate 202, one surface of which is coated with a polymer film 204. It should be clear to those skilled in the art that the polymer films 204 may be deposited onto both sides of the substrate 202. The substrate 202 may include, for example, a polymer substrate, glass substrate, TAC substrate, polypropylene substrate, polycarbonate substrate, acryl substrate, PMMA substrate, and so forth. The substrate 202 may have any suitable form and shape such as flat or having arched plates, or any other more or less complex form.

Figure 3:
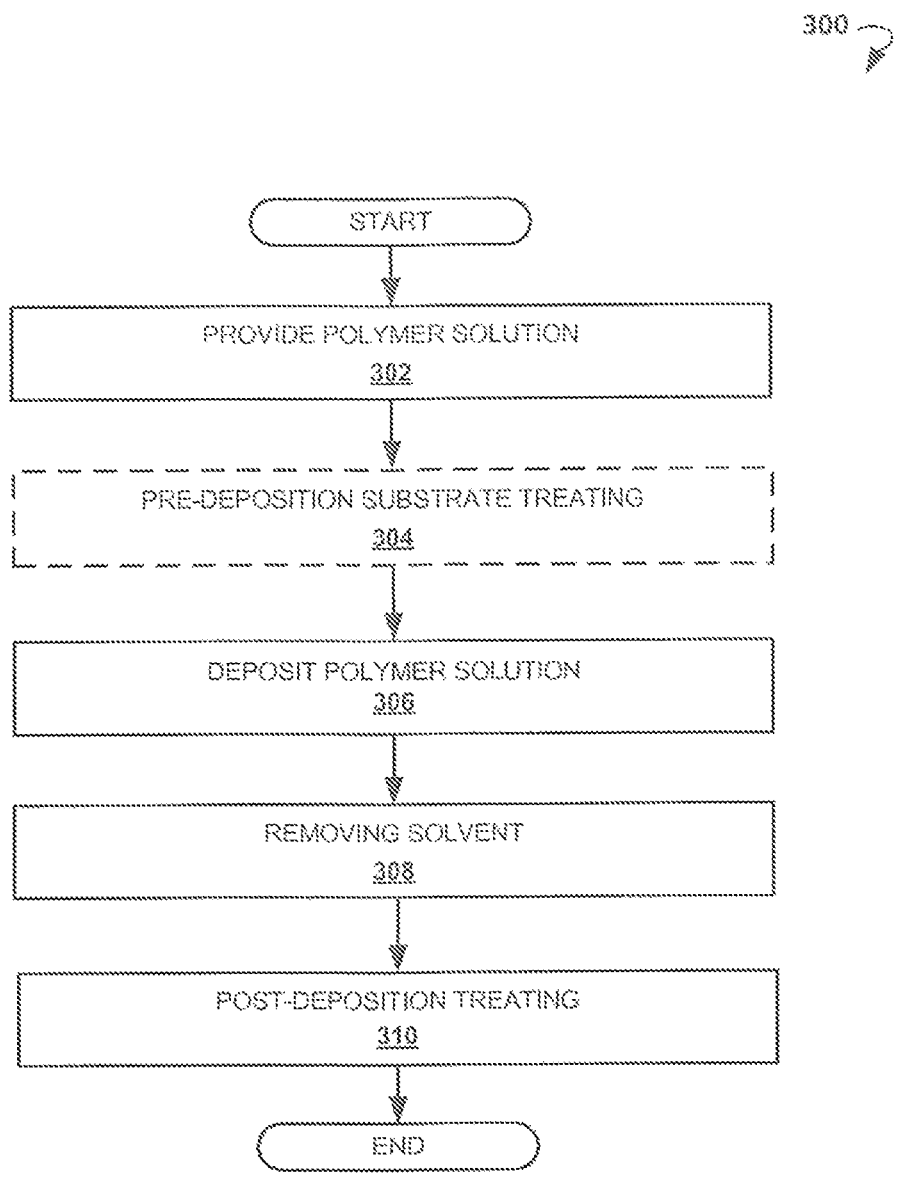
FIG. 3 shows a schematic illustration of a method for depositing a water-based polymer solution on a substrate in accordance with various embodiments of the present disclosure.

FIG. 3 shows a schematic illustration of a method 300 for depositing a polymer solution on a substrate 202 in accordance with various embodiments of the present disclosure. The method 300 may commence at operation 302 with providing a polymer solution. Various examples of polymers are described above which may include, generally speaking, water-soluble polymers, although water-insoluble polymers may be also utilized. Soluble polymers described herein may be dissolved in water or other solvents. In various embodiments, solvents may include water, ketones, binary ketone/alcohol mixtures, hydroxyketones, tetrahydrofuran (THF), methyl acetate (MA), MIBK. In various embodiments, the polymer solution may include one or more additives such as nonylphenoxypoly glycidol, alcohols, acids, plasticizing agents, stabilizers, antioxidants, and hindered phenol. The selection of the additives may depend on particular polymers used, substrate type, and specific purposes.

The polymer solution may be characterized by a solid content, which is defined as a weight ratio of a polymer and other non-solvent components, if present, to the overall weight of the solution. The solid content may be varied to achieve a necessary viscosity and a shrinkage ratio between the wet and dry coating. For purposes of this document, the shrinkage ratio is defined as a ratio of two thicknesses, such as a thickness of the initial coated polymer solution before any drying occurs and a thickness of the fully dry polymer structure, i.e., the structure with the solid content of 100%. In some embodiments, a shrinkage ratio of some intermediate states may be used, such as between a partially dry state and a fully dry state. The solution may be also characterized by a polymer type, molecular weight of the polymer, temperature, and other characteristics. Some of these characteristics may be specific to a particular deposition technique.

In some embodiments, the substrate 202 may be pretreated at optional operation 304 to improve adhesion of the polymer to the substrate 202, to introduce cross-linking agents, and other purposes. Some examples of pretreating techniques may include cleaning of substrate 202, saponification, leaching, oxidizing, or modifying surface relief (e.g., by subjecting to corona discharge. Various examples of pretreating procedures are given in the examples below.

At operation 306, the polymer solution is deposited onto one or more surfaces of the substrate 202 to generate a layer of polymer solution. The wet thickness of this layer may be selected based at least in part on desired dry thickness of the polymer. For example, the ratio of wet thickness to the desired dry thickness of the polymer film may be between about 5% and 20%. It should be also noted that the polymer solution is isotropic prior to deposition.

In general, the polymer solution may deposited using one or more of the following techniques: a slot die technique, spray technique, molding technique, roll-to-roll coating technique, Mayer rod coating technique, roll coating technique, gravure coating technique, micro-gravure coating technique, comma coating technique, knife coating technique, extrusion technique, printing technique, dip coating technique, and so forth. Some examples of these techniques are described in more detail below.

At operation 308, the solvent is removed from the polymer solution deposited onto the substrate 202. The solvent may be removed using one or more techniques including, for example, heating, drying, or subjecting to UV or IR light radiation. Some examples of these techniques are further described below.

At optional operation 310, one or more post-deposition treating techniques may be employed. The post deposition treating techniques may include cross-linking of organic units or shaping of the deposited polymer films. It should be understood that the sequence of operations 308 and 310 may be arbitrary. In certain embodiments, as shown in FIG. 3, the first solvent should be removed, and then a specific post-deposition process may be performed. In certain other embodiments, some post-deposition processes shall be performed first, and then the solvent may be removed. In yet other example embodiments, operations 308 and 310 are performed simultaneously. Furthermore, in yet other example embodiments, there may be several post-deposition operations 310 which are performed before operation 308 and right after operation 308. Those skilled in the art will appreciate that other example embodiments are possible as well.

Below are provided various examples associated with operations 304, 306, 308, and 310.

Examples of Pre-Deposition Substrate Treating Techniques

In various embodiments of the present disclosure, the substrate 202 may be subjected to a pre-deposition treatment to improve wettability and adhesion of a later deposited polymer film.

In one example of the pre-deposition treatment, a TAC substrate may be subjected to saponification by first rinsing the substrate with water, followed by dipping or coating the substrate with an aqueous solution of sodium hydroxide, followed by additional rinsing, and finally drying. The dipping operation may be between about 0.5 minutes and 5 minutes in duration or, more specifically, between about 1 minute and 3 minutes, for example, about 2 minutes. The aqueous solution may include between about 1% and 20% by weight of sodium hydroxide or, more specifically, between about 2% and 10%, such as about 6%. The solution may be kept at between about 20° C. to 90° C. or, more specifically, at between about 40° C. and 80° C., such as about 60° C. However, it should be noted that the temperature may vary during the saponification process and may depend on multiple criteria.

In another example of pre-deposition treatment, a glass substrate 202 may be subjected to an ultrasonic cleaning using a mildly alkaline water solution. For example, between about 0.1% and 10% by weight (e.g., about 1%) of DECONEX® 12-PA (available from Borer Chemie AG in Zuchwil, Switzerland) may be used for these purposes. The cleaning solution may be kept at a temperature of between about 20° C. and 40° C., such as about 30° C. The duration of the ultrasonic cleaning phase may be between about 0.5 hours and 24 hours or, more specifically, between 1 hour and 5 hours, such as about 2 hours. The glass substrate may be then subjected to soaking and washing with water before subjecting to leaching and oxidizing in an aqueous solution containing between about 1% and 20% by weight of sodium hydroxide or, more specifically, between about 2% and 15%, such as about 15%. The leaching and oxidizing may be performed in an ultrasonic bath for between about 5 minutes and 120 minutes or, more specifically, between about 10 minutes and 60 minutes, such as about 30 minutes. The glass substrate may be then rinsed and dried.

In yet another example of pre-deposition treatment, a thin layer of a primer may be deposited onto a substrate 202 prior to the deposition of a polymer solution layer. The dry thickness of the primer may be between about 10 nm and 200 nm or, more specifically, between about 20 nm and 100 nm such as about 50 nm. For example, silane or polyethyleneimine may be used as primers. A water based polymer solution containing less than 10% by weight of primer or, more specifically, less than 2%, such as about 0.5% may be used for this purpose.

Other pre-deposition substrate treatment techniques may include exposing a surface of substrate to corona discharge, coating a thin layer of a surfactant solution, coating a thin layer of an alcohol, subjecting to electron beam, subjecting to ion beam, subjecting to plasma discharge, and so forth. In any case, the pre-deposition substrate treatment techniques may improve the substrate's adhesion and wettability properties.

Examples of Deposition Techniques

Below are provided several examples of deposition techniques used for applying a layer of polymer solution onto a substrate 202. One having ordinary skills in the art would understand that some of these characteristics may be also applicable to other deposition techniques as well.

Slot Die Extrusion Example

The slot die technique is generally suitable for depositing uniform layers having a thickness in the range of about 1 micron to about 2000 microns (wet), using solutions (or slurries) having viscosities of 1 cP to 100,000 cP and maintained at temperatures of up to 250° C., and using linear speeds of up to 500 meters per minute. The viscosity of the coated polymer may be controlled by molecular weight, solid content, additives, and temperature. Viscosity may impact flow characteristics of polymer solutions, shear stresses applied to the forming film, and as a result alignment of polymer molecules within a deposited layer and resulting optical characteristics of the layer. The polymer solution temperature, which may be referred to as a feeding temperature may be between about 10° C. and 80° C. Below 10° C., the water gets closer to its freezing point, while temperatures above 80° C. may cause rapid evaporation and loss of water resulting in a system that may be difficult to control. Before deposition, it should be ensured that the polymer solution is homogeneous, which may be done by warming and/or stirring. At this step, one or more additives may be added to the polymer solution based on an application or certain tasks.

The provided solution is then deposited onto the substrate as a thin layer. As noted above, the polymer solution may be deposited onto a substrate or be formed into free-standing structures according to one or more embodiments described above. The thickness of the deposited layer may depend on one or more of the following: a substrate feed speed, substrate width, polymer solution feed rate, and solids content. The substrate feeding speed may be in between 0.5 meters per minute and 500 meters per minute or, more specifically, between 2 meters per minute and 20 meters per minute. While faster speeds are beneficial from the process throughput perspective, the feeding speed may be controlled to achieve specific shear forces for redistributing and aligning polymer molecules within the deposited layer. The feeding rate of polymer solution may be between 1 gram per minute and 2500 grams per minute. In some embodiments, deposited film thickness may be between 10 microns and 2000 microns or, more specifically, between 25 microns and 250 microns. This is the thickness of the wet coating and changes substantially during drying. As noted above, the degree of change, i.e., the shrinkage ratio, depends on the solid content and other factors.

When the slot-die technique is used, slot die lips may be separated by a distance between 10 microns and 1000 microns or, more specifically, between 25 microns and 250 microns. The lip separation may determine pressure in the die and therefore film thickness uniformity. Additionally, the slot die is spaced relative to the substrate and allows the polymer solution to flow onto the substrate and be deposited as a uniform layer. In some embodiments, the gap between the slot die and the substrate is between 10 microns and 1000 microns or, more specifically, between 25 microns and 250 microns, and may be varied to control coating quality.

In order to better understand some equipment based parameters, such as spacer thicknesses, substrate feeding speed, and solution feeding rates, a brief description of the slot die coating system may be helpful. A slot die coating system may include five main components: a die, a die positioner, a roll, a fluid delivery system, and a substrate. The die determines the rate of polymer solution dispensing onto the substrate. The fluid rheology (e.g., viscosity, surface tension) is a contributing factor together with a design and position of the die. Some polymer based solutions have specific rheological properties that require specific design of the die, e.g., the internal flow geometry. The die manifold is the contoured flow geometry machined into the body sections of the die. The function of the die is to maintain the solution at the proper temperature for application, distribute it uniformly to the desired coating width, and apply it to the substrate. The manifold distributes the coating fluid that enters the die to its full target width and is designed to generate a uniform, streamlined flow of material through the exit slot of the die. The die positioner is an adjustable carriage that precisely positions the slot die at the optimum angle and proximity to the roll and isolates the die from vibrations that can affect coating application. The die positioner stabilizes the interaction between the die and the moving substrate, sets the angle of dispensing between the die and substrate, and sets the distance between the die and substrate. The roll provides a precisely positioned surface with respect to the die position and is used for supporting the substrate. The fluid delivery system is used to provide a constant feed of polymer solution into the die. The delivery system may determine the coat weighting weight and thickness of the deposited layer.

Roll-to-Roll Deposition Example

When a roll-to-roll technique is used (which is also known as web processing or reel-to-reel processing), a polymer solution may be deposited on a substrate presented in the form of a film. The deposition may be made using any suitable techniques. In an example, the deposition may include the use of applicator, which may be adjusted by a sheer force (a knife) on a moving substrate. The deposition may be performed such that further drying technique is applied, or UV cross-linking techniques is utilized as described below. Once the substrate film has been coated, it is rolled onto another roll and may be slit to a desired size on a slitter or be further processed to extrusion, embossing, subjecting to high-temperature or dipping to barium chloride solution (alone or combined) as further described below. In addition, it should be noted that the substrate film may be secured on a roll and rolled out at a predetermined rate such that the polymer solution may be delivered onto the substrate film with desired thickness.

As noted above, before deposition, homogeneity of the polymer solution should be ensured. The web speed and/or coating solution flow rate should be set so as to control desired shear stress and coating thickness. The polymer solution solids concentration and feed temperature should be also set.

In an example, the substrate was coated with the polymer solution to exhibit a negative C-plate behavior with out of plane retardation values (Rth) defined as:

$$Rth=\text{thickness}*(nz-0.5(nx+ny))$$

The Rth values may be controlled by dry coating thickness. Table 1 below shows various wet thicknesses achieved during the deposition technique of a polymer containing 2,2'-disulfo-4,4'-benzidine terephthalamide-isophthalamide (hereinafter referred to as "P17") of known solids concentration (N) and flow rate through an 11-inch wide shim at 25 ft/min.

TABLE 1

| N % | Coat width ft | Web speed ft/min | Flow rate g/min | Calculated wet thickness micrometer | Measured dry thickness micrometer | Measured - Rth @ 550 nm Nanometer |
| --- | --- | --- | --- | --- | --- | --- |
| 4.0 | 0.92 | 25 | 89.2 | 41.9 | 1.36 | 177 |
| 4.0 | 0.92 | 25 | 136.4 | 64.1 | 2.07 | 250 |
| 4.0 | 0.92 | 25 | 143.7 | 67.5 | 2.26 | 261 |
| 7.1 | 0.92 | 25 | 218.8 | 182.4 | 5.85 | 587 |

Figure 4A:
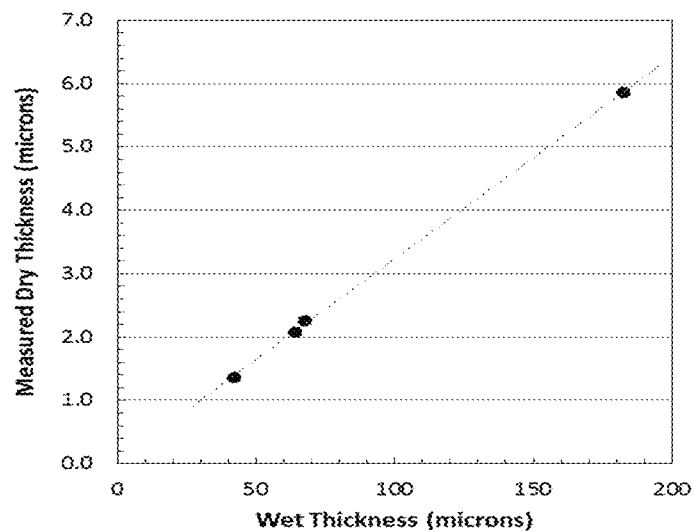
FIG. 4A shows example dry thickness dependency against wet thickness for a polymer solution deposited onto a substrate.
Figure 4B:
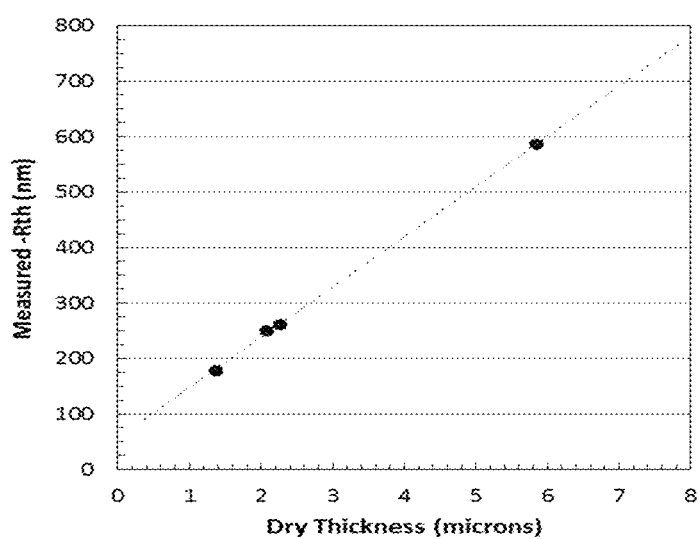
FIG. 4B shows example thickness retardation dependency against dry thickness for a polymer solution deposited onto a substrate.

The dry thickness measurement of the deposited polymer solution is linear with the set wet thickness (though not exactly by 4% since the polymer film compacts upon drying). It can be predicted that the measured Rth is linear with the thickness of the P17 layer. Thus, the retardance may be controlled through the deposition conditions and characteristics. This is further illustrated in FIGS. 4A and 4B, which show dry thickness dependency against wet thickness (FIG. 4A) and retardation dependency against dry thickness (FIG. 4B).

Figure 5:
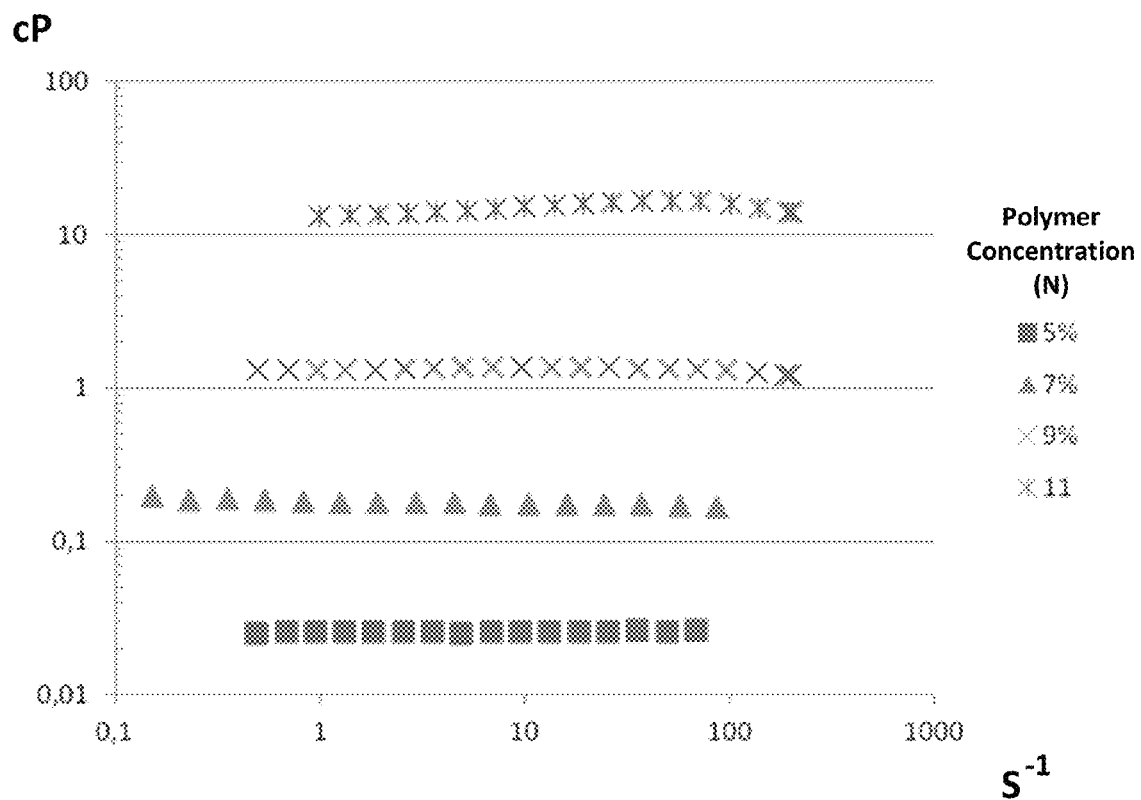
FIG. 5 shows measured dependencies of viscosity (cP) as a function of shear rate ($s^{-1}$) for different polymer concentrations (N).

As already noted, the viscosity of the coated polymer solution may be controlled by various parameters such as a molecular weight, solid content concentration, temperature, and so forth. Viscosity may also impact flow and characteristics of polymer solutions, shear stresses applied to the forming polymer solution film, and as a result alignment of polymer molecules within a deposited layer and resulting optical characteristics of the optical layer. FIG. 5 shows measured dependencies of viscosity (cP) as a function of shear rate ($s^{-1}$) for different polymer concentrations (N).

Molding Deposition Example

When a molding technique is used, a polymer solution may be delivered into a mold cavity that has one or more surfaces permeable to air and water vapor but not permeable to polymer molecules (e.g., because of their large sizes). The molds may be configured to produce lenses or other optical elements with specific physical optical properties such as refraction, aberrations, curvatures, and so forth.

Figure 6A:
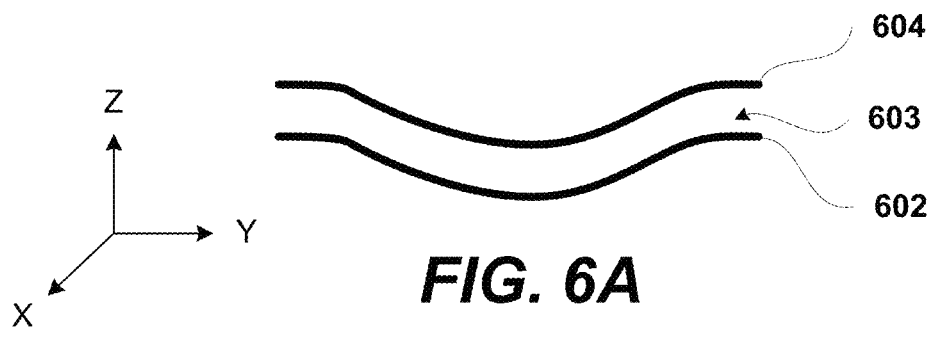
FIGS. 6A-6C show example molding operations to form an optical element.
Figure 6B:
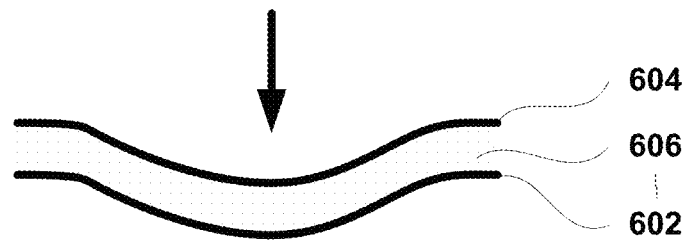
Figure 6C:
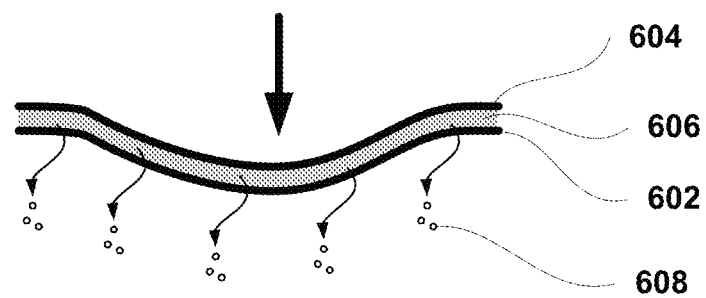

A sequence of molding operations is schematically illustrated in FIGS. 6A-6C. Specifically, FIG. 6A illustrates a mold 600 having a first surface 602 and a second surface 604. First surface 602 and second surface 604 form a cavity 603 for receiving a polymer solution. The spacing between first surface 602 and second surface 604 may be initially (i.e., during the receiving of the polymer solution) greater that the side of the final polymer structure in order to accommodate for shrinking during drying. In some embodiments, the first surface 602 and second surface 604 are movable with respect to each other to follow and control the profile of the drying (and shrinking) polymer.

FIG. 6B illustrates the mold 600 with polymer solution 606 disposed into the cavity. The polymer solution 606 may be injected into the cavity, while the cavity maintained in a certain initial closed configuration. The internal volume of the cavity determines the amount of the polymer solution that can be provided into the mold 600. In another example, the cavity 603 may be initially open and the polymer solution may be initially supplied onto one surface of the mold 600 (e.g., the first surface 602), while another surface (e.g., the second surface 604) then engages and displaced some polymer solution out of the cavity thereby ensuring that the entire cavity is filled with the polymer solution. Unlike the conventional injection molding in which a thermoplastic polymer is melted and supplied into a mold in its melted state, polymer solution 606 may be supplied at relatively low temperatures, e.g., between about 40° C.-250° C. to prevent degradation of polymers. The viscosity of the polymer solution may be controlled by the solid content as described above with reference to the slot die coating.

One or both surfaces 602 and 604 may be permeable to water vapor so that the water vapor can escape from mold 600 during drying of the polymer solution. However, the surfaces 602 and 604 still retain polymer molecules within the mold. For example, one or both surfaces 602 and 604 may have micro-holes. One or both surfaces 602 and 604 may be heated to between about 100° C. and 250° C. to expedite drying and evaporation of the solvent from the polymer solution.

As the solvent leaves the mold 600, the thickness of the polymer solution inside the mold 600 may reduce. In order to avoid empty cavities within the mold 600, surfaces 602 and 604 may be configured to move towards each other in the direction shown in FIG. 6C. The position of surfaces 602 and 604 may be used to control drying of the polymer solution, e.g., the amount of heat supplied surfaces 602 and 604 or, more specifically, temperatures of surfaces 602 and 604. This feedback may be used to prevent excessive or inadequate drying.

It should be also noted that the surfaces 602, 604 may have a specific shape, form or design. For example, the surfaces 602, 604 may be of a hemi-spherical shape so as to form a lens or similar device. The surfaces 602, 604 may also have specific design so as to form, for example, Fresnel lens like devices.

Examples of Removing Solvent Technique

Returning now to FIG. 3, at operation 308, solvent is removed from the deposited polymer solution. The solvent may be removed by drying at temperatures of at least about 80° C. The upper limit is generally determined by the stability of the polymer used in the solution. These temperatures may represent the actual temperature of the material during its drying or the temperature of surrounding components, such as the temperature of the substrate, the temperature of atmosphere over the surface of the material, and the like. The drying may be also performed by blowing drying gas at specific temperatures. For example, the drying gas may include nitrogen or heated air. In general, higher temperatures are preferred to expedite the drying process. However, fast removal of water may disturb the arrangement of polymer molecules within the drying structure and distort optical properties.

In certain example embodiments, the drying process may include multiple steps. For example, the drying by heating may also include subsequent cooling of the polymer solution. In various embodiments, one or more drying devices may be utilized such as flash dryers, rotary dryers, spray dryers, fluidized bed dryers, vibrated fluidized beds, contact fluid-bed dryers, plate dryers, and so forth.

Examples of Post-Deposition Treating Techniques

Shaping

Figure 7A:
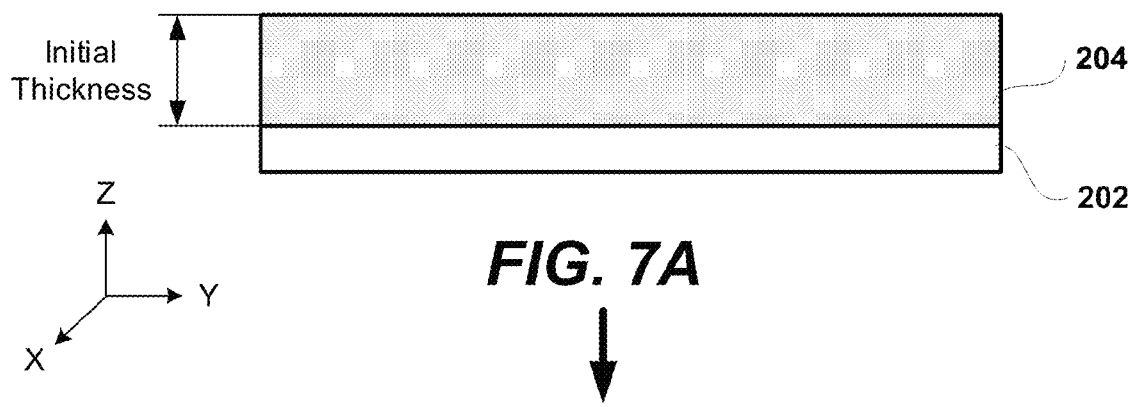
FIGS. 7A, 7B show an example grooving process of polymer solution layer deposited onto a substrate.
Figure 7B:
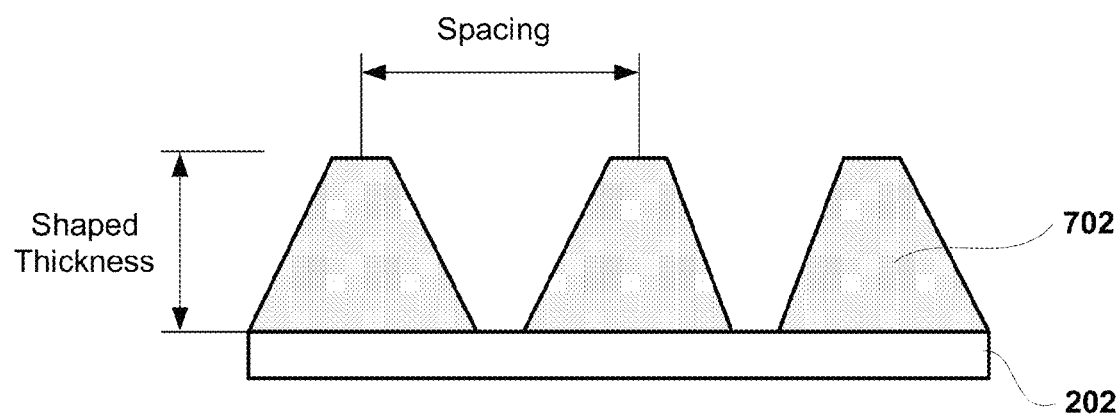

In various embodiments, post-deposition treating operation 310 may involve shaping of polymer solution layer. For example, a polymer solution layer may be embossed to form grooves, for example, as shown in FIGS. 7A and 7B. Specifically, in FIG. 7A there is shown a substrate 202 having a polymer solution layer 204 deposited on top thereof. FIG. 7B shows the result of grooving of the polymer solution layer 202, namely shaped polymer coating 702. Shaping of the polymer solution layer may be performed on a fully dried polymer structure (i.e., the solid content of about 100%), on a partially dried polymer structure, or on a deposited polymer coating before any drying occurred. In the latter two cases, the shaping device (e.g., an embossing roll) may need to accommodate for subsequent changes in thickness. As such, the tolerance of the shaping devices used in these cases may not need to be as precise as for the device used on a fully drier polymer structure.

Shaping of the polymer structures (regardless of their drying state) may be performed while the polymer structures are kept between about 50° C. and 200° C. The shaping tool may be also heated to this temperature range. In some embodiments the shaping tool is heated to between about 100° C. and 200° C. while the polymer structures may be maintained at the same temperature or lower temperature prior to contacting the shaping tool. One having ordinary skills in the art would understand that some drying may occur at these conditions if the polymer structures still have solvent. In some embodiments, some drying is performed after the polymer structure is shaped. This post-shaping drying may be performed in addition to pre-shaping drying.

In yet another example, the solid content of the dry polymer can be reduced by adding solvent. This may be done in order, for example, to reshape the polymer. Furthermore, the fully or partially dry polymer may be extruded into fibers and hollow tubes. Unlike conventional extrusion in which thermoplastic polymers are heated to make them conformal, water can be added to the water soluble polymers before shaping or extrusion.

Cross-Linking

The post-deposition treating operation 310 may involve cross-linking of polymer chains using UV light radiation, IR light radiation or other types of activation energy sources such as electron, ion or gamma radiation. The cross-linking may involve forming links between two or more adjacent polymer molecules and/or extending polymer molecules by linking end groups. Examples of UV sensitive groups responsible for cross-linking may include carbon double bonds and carbon triple bonds. The groups may be introduced into some or all monomers during their synthesis. The groups may be relatively inactive during coating and partial or even entire drying operations but capable of activating after coating and, in some embodiments, after partial or complete drying. In various example embodiments, UV light radiation may have wavelengths, for example, of about between about 180 nanometers and 400 nanometers.

One example of UV cross-linking will now be described in more details. A polymer shown below may be formed into a negative C-plate. When a deposited polymer film is subjected to UV light irradiation, the irradiated polymer film becomes less soluble before any further post-treatment, such as exposing to metal cations for cross-linking. Without being restricted to any particular theory, it is believed that double bonds present in each polymer molecule react under UV-irradiation forming inter-molecular bonds with adjacent molecules. Below is shown an example cross-linking of polymers having derivative structural formulas (XI), (XII):

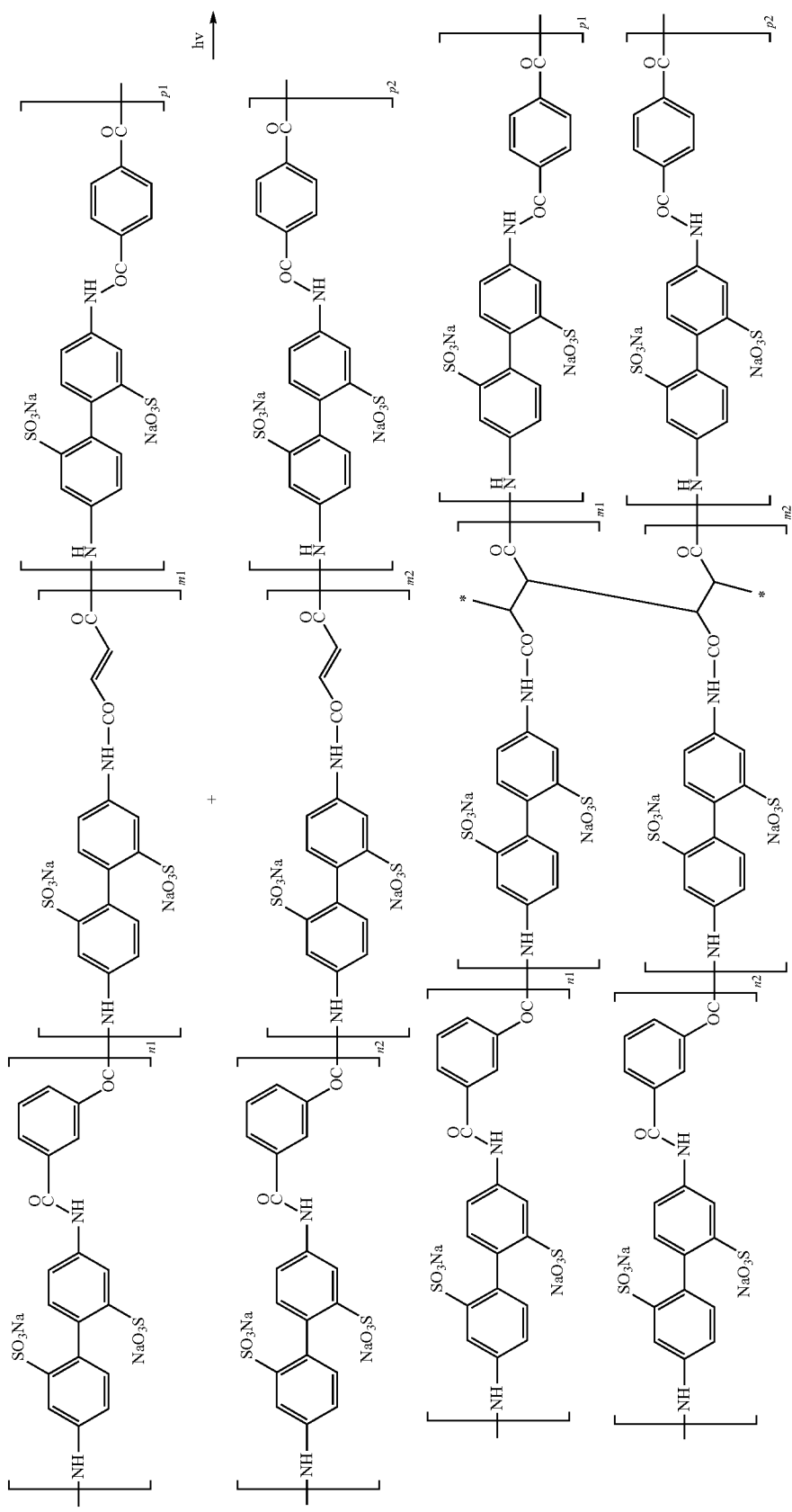

Asterisks as shown above designate continuations of the polymeric chains. Even though these asterisks are shown in 2D to continue into two directions, they can also continue in three directions in 3D.

Another example is presented by the formula below. The polymer uses chain terminators to control the molecular weight. Without these chain terminators, the material may extend to a molecular weight of 220,000 units and become insoluble. With the chain terminators, the molecular weight may be reduced to about 20,000 units and has sufficient solubility. These chain terminators may be UV-curable groups (e.g., C=C double bonds) that could be easily activated to increase the molecular weight in the film after coating, to provide a 3D network, and to reduce solubility. This example is further illustrated by the following structural formulas:

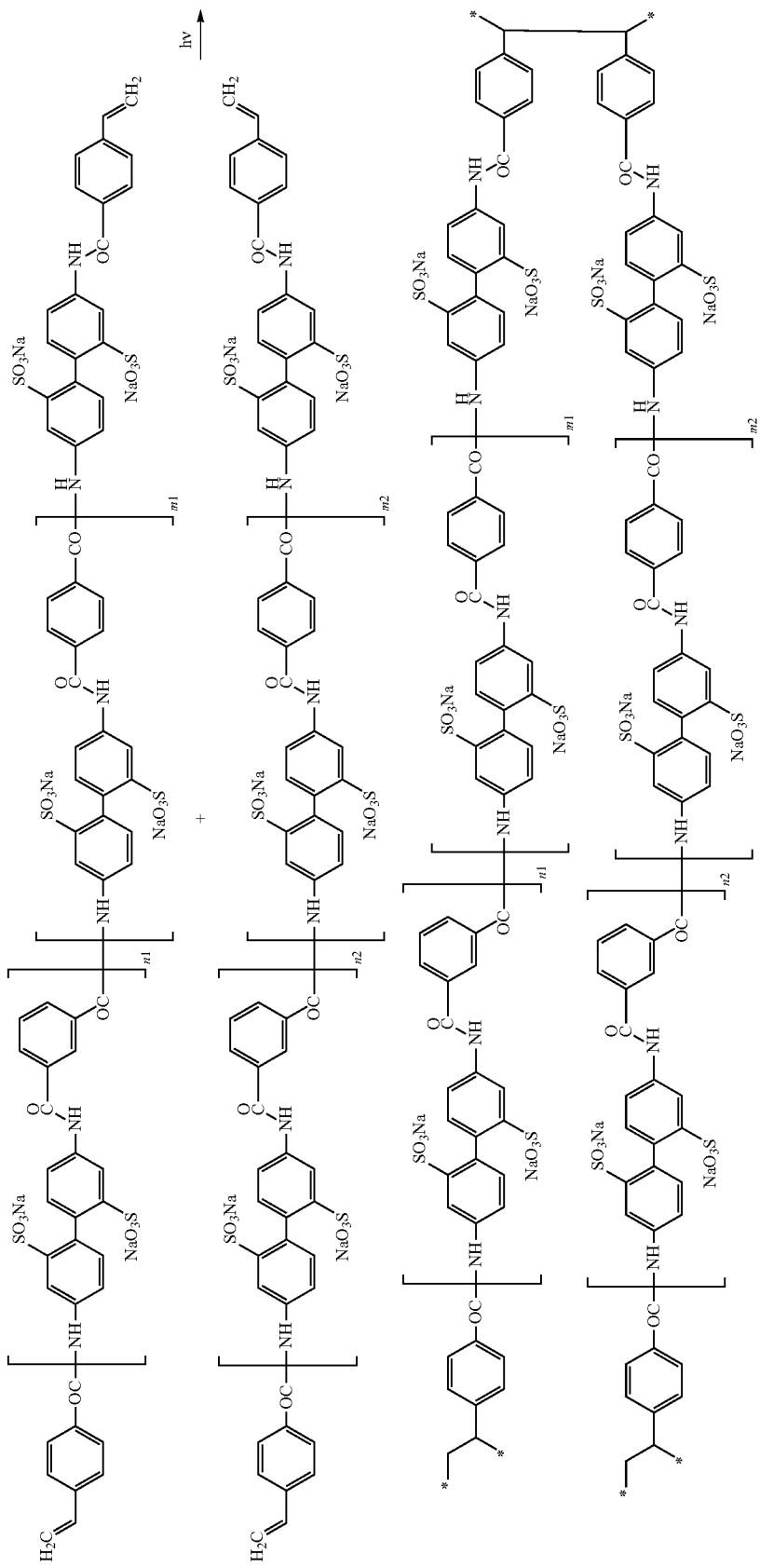

Asterisks as shown above designate continuations of the polymeric chains.

Conversion of Polymer Films into Water-Insoluble Form

In some embodiments, method 300 may involve a post-deposition treatment of the polymer layer with a solution of a water-soluble inorganic unit having one or more of the following cations: $H^+$, $Ba^{2+}$, $Pb^{2+}$, $Ca^{2+}$, $Mg^{2+}$, $Sr^{2+}$, $La^{3+}$, $Zn^{2+}$, $Zr^{4+}$, $Ce^{3+}$, $Y^{3+}$, $Yb^{3+}$, $Gd^{3+}$, and any combination thereof. For example, a dry polymer layer may be dipped or otherwise come in contact with one or more of the following: barium chloride, barium nitrate, lanthanum chloride, lanthanum nitrate, aluminum salt, and so forth.

In certain embodiments, a dry polymer layer may be dipped or otherwise come in contact with a barium nitrate ($Ba(NO_3)_2$), barium chloride ($BaCl_2$), or lanthanum chloride ($LaCl_3$) water based solution. The concentration of barium nitrate in water may be between about 2% and 20% by weight or, more specifically, between 5% and 15%, such as about 8.5% by weight. For example, 87.55 g of anhydrous barium nitrate may be dissolved in 942.45 g of water. The duration of the dry polymer layer with the post-treatment solution may be between about 0.1 seconds and 10 seconds or, more specifically, between about 0.5 seconds and 5 seconds such as between about 1 second and 2 seconds. After this exposure to the salt solution, the polymer layer is rinsed with water and dried. In a roll-to-roll deposition operation, the substrate may be passed through a bath containing the post-treatment solution and the through the bath containing water followed by the drying. In some embodiments, the post-treatment solution may be applied as a coating over the dry polymer layer using for example slot die or spray techniques to better control distribution of the post-treatment solution. The substrate may be then sprayed with the water to rinse off the post-treatment solution and then be dried. This method avoids exposure of the back side of the substrate to any residual salts. In some embodiments, one or more operations described above are repeated one or more times using the same solutions.

Examples of Optical Elements

Figure 8:
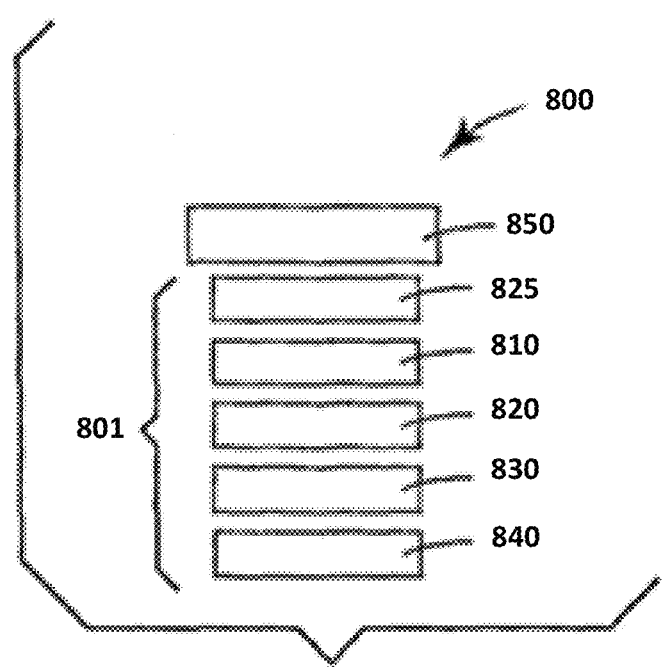
FIG. 8 show an example schematic cross-sectional view of an example display system.

FIG. 8 illustrates a schematic cross-sectional view of one illustrative display system 800 including a light modulator 850 disposed on an optical compensator stack 801 that includes a j-retarder 810 disposed on a first liquid crystal layer 820. The j-retarder 810 includes a layer of polymeric film being substantially non-absorbing and non-scattering for at least one polarization state of visible light. The j-retarder 810 has x, y, and z orthogonal indices of refraction where at least two of the orthogonal indices of refraction are not equal, an in-plane retardance being 100 nm or less and an absolute value of an out-of-plane retardance being 50 nm or greater. The first liquid crystal layer 820 includes liquid crystal material. The first liquid crystal layer 820 may be an o-plate, an a-plate and the like. The optical compensator stack 801 may include a second liquid crystal layer 825 disposed on the j-retarder 810 or the j-retarder 810 can be disposed between the second liquid crystal layer 825 and the first liquid crystal layer 820. The second liquid crystal layer 825 may be a positive A-plate or the like. The optical compensator stack 801 may further include a polarizer layer 830 disposed on the first liquid crystal layer 820 or the first liquid crystal layer 820 can be disposed between the polarizer layer 830 and the j-retarder 810. The polarizer layer 830 may be an absorbing polarizer or a reflecting polarizer. A reflecting polarizer layer 840 can be disposed on the polarizing layer 830 or the polarizing layer 830 can be disposed between the reflecting polarizing layer 840 and the first liquid crystal layer 820.

Figure 9A:
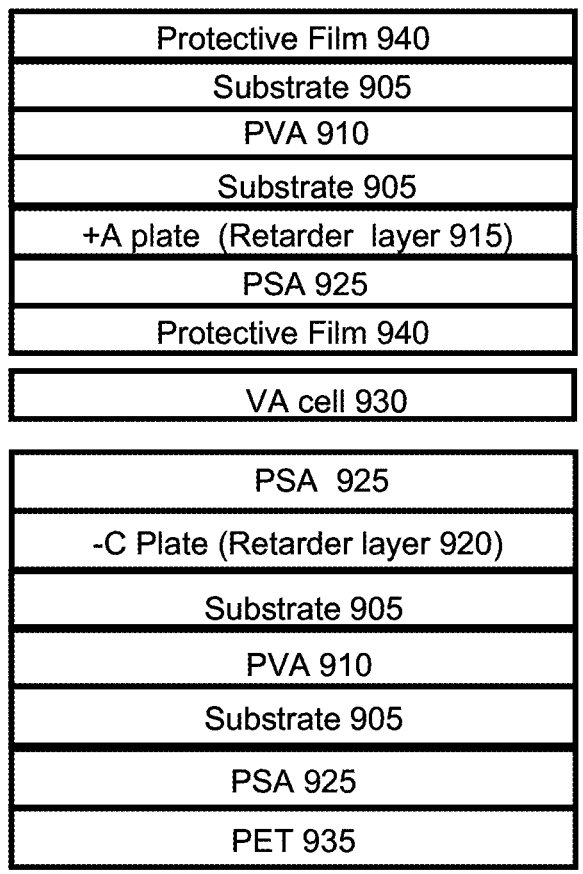
FIGS. 9A-9B illustrate schematic cross-sectional view of various example display system stacks.
Figure 9B:
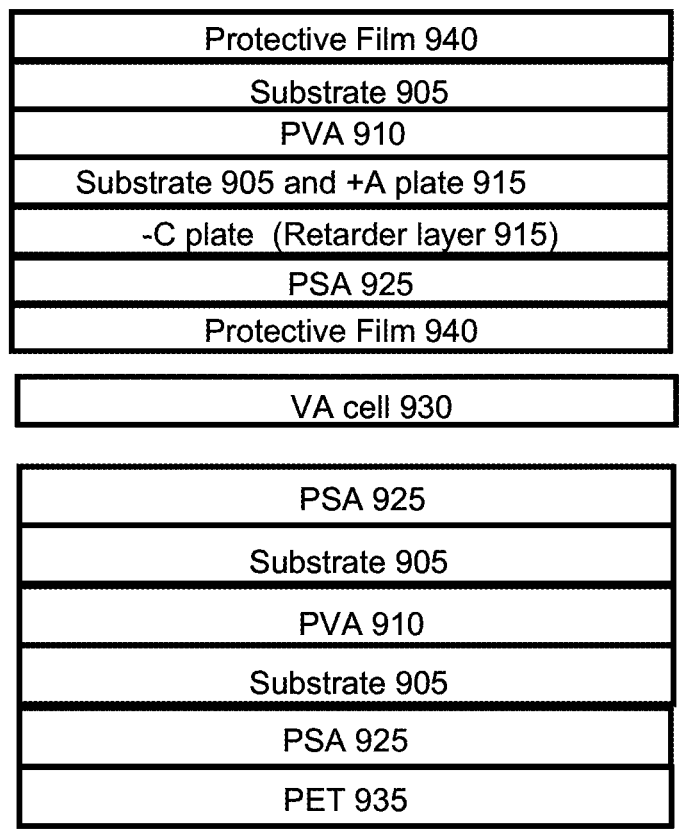

FIGS. 9A-9B illustrate schematic cross-sectional view of various example display system stacks 900. In FIG. 9A, there is shown the stack 900 including four substrates 905 (e.g., TAC substrates) having the thickness of about 80 micrometers and Patterned Vertical Alignment (PVA) layers 910 arranged therebetween. The PVA layers 910 may have the thickness of about 20 micrometers. Adjacent to the substrates 905, deposited are a retarder layer 915 represented by a positive A-plate created using the techniques described herein and a retarder layer 920 represented by a negative C-plate created using the techniques described herein. The retarder layers 915, 920 may have the thickness of about 3 micrometers or even less. The stack 900 also includes polymer stabilized alignment (PSA) layers 925 having the thickness of about 30 micrometers. Vertical alignment (VA) cell layers 930 are interposed between the substrates 905. PET layers 935 and protective films 940 may be also used, the thickness of which may be about 25-30 micrometers. The overall thickness of the stack 900 may be of about 200 micrometers.

Experimental Results

One experiment was conducted to determine effectiveness of a barium chloride post-treatment on water solubility of a polymer. A polymer containing 2,2'-disulfo-4,4'-benzidine terephthalamide-isophthalamide was deposited as a 350 nanometer thick film on a TAC substrate. A set of samples was cut from this film and were dipped for about 1-2 second into a 10% by weight water solution of barium chloride following by rinsing with water and drying. Another set of samples was used as a reference and was not subjected to any post-treatment operations. A part of each set was then subjected to three day exposure to 100% relative humidity at the room temperature, while the remaining part of each set was subjected to 20 day exposure to 90% relative humidity at 60° C. All samples were then evaluated for adhesion of the polymer. The results of the test are presented in the Table 2 below.

TABLE 2

| Post-treatment | Δ-Rth (nm) | % Film removed | Environmental exposure | % Film removed |
| --- | --- | --- | --- | --- |
| BaCl2 | 2 | 0 | 3 days: RoomT/100% RH | 0 |
| None | — | 0 | 3 days: RoomT/100% RH | 100 |
| BaCl2 | 2 | 0 | 20 days: 60° C./90% RH | 0 |
| None | — | 0 | 20 days: 60° C./90% RH | 60 |

Specifically, the 20 days exposure to 90% relative humidity at 60° C. resulted in 60% film removal of the untreated film and effectively no removal of the treated film. The 3 day exposure to 100% relative humidity at 25° C. resulted in 100% removal of the untreated film and still effectively no removal of the treated film. As such, the post-deposition treatment of 2,2'-disulfo-4,4'-benzidine terephthalamide-isophthalamide with barium chloride resulted in a treated layer that is much more resistant to moisture than the untreated layer. Without being restricted to any particular theory, it is believed that barium chloride causes cross-linking between rod-like molecules of 2,2'-disulfo-4,4'-benzidine terephthalamide-isophthalamide. Overall, the post-treatment allows to covert water soluble polymers, which may be easier to process than other types of polymers, into water resistant polymers, which can withstand water commonly found in the operating environments.

In another experiment, pre-treatment techniques were evaluated to improve wettability and adhesion of 2,2'-disulfo-4,4'-benzidine terephthalamide-isophthalamide to a TAC substrate. One set of substrates was pretreated with polyethyleneimine, while another set was used as a reference and was not pretreated. The substrates of both sets were coated with 2,2'-disulfo-4,4'-benzidine terephthalamide-isophthalamide to approximately 2.5 microns dry. The samples were then tested for adhesion using ASTM 3359 protocol. Some samples were tested soon after the coating while other samples were first exposed for 40 days to 90% relative humidity at 60° C. The results of this test are provided in the Table 3 below.

TABLE 3

| Pre-treatment | % Film removed | Environmental exposure | % Film removed |
| --- | --- | --- | --- |
| Polyethyleneimine | 0 | 40 days: 60 C./90% RH | 6 |
| None | 0 | 40 days: 60 C./90% RH | 32 |

Specifically, the pre-treated substrates demonstrated much better adhesion than the untreated substrates after exposure to the environmental conditioning. Only 6% of the film was removed from the pre-treated substrate in comparison to almost one-third removal of the film from the untreated substrate.

Figure 10:
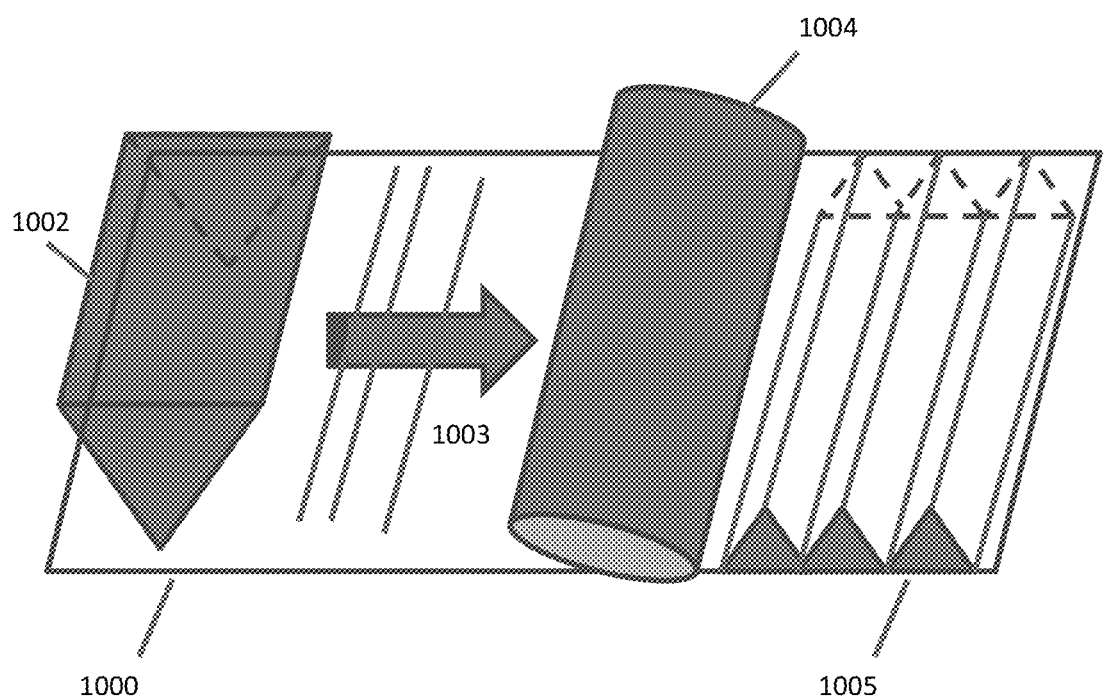
FIG. 10 illustrates a slot die deposition technique.

FIG. 10 illustrates a slot die 1002 deposition technique which includes rolling an embosser roll 1004 over the substrate 1001 of a film in a coating direction 1003. This technique results in a final structure 1005 imprinted on the film.

Conclusion

Thus, methods of forming various optical elements by depositing polymer solutions on substrates have been disclosed. These methods may include one or more pre-deposition procedures and/or one or more post-deposition procedures. Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses disclosed herein. Accordingly, the present embodiments are to be considered as illustrative and not restrictive.

What is claimed is:

1. A method of forming an optical element, the method comprising:
providing a polymer solution, the polymer solution comprising a solvent and a polymer, wherein the polymer comprises a plurality of copolymer molecules each copolymer molecule having organic units having the following structural formulas:

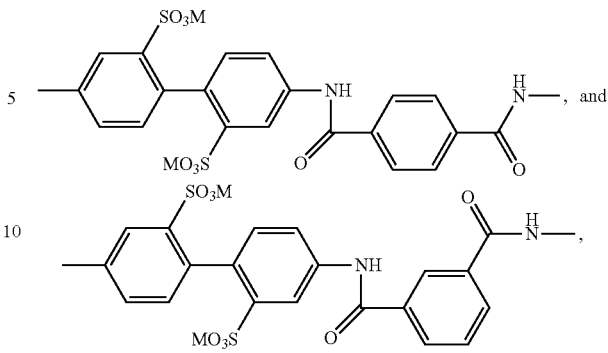

wherein M is a counterion;
depositing a layer of the polymer solution on the surface of a base structure;
removing the solvent from the polymer solution to form a dry polymer layer; and
cross-linking two or more of the copolymer molecules.

2. The method of claim 1, wherein the cross-linking of the two or more of the copolymer molecules is performed according to the following endgroup reaction:

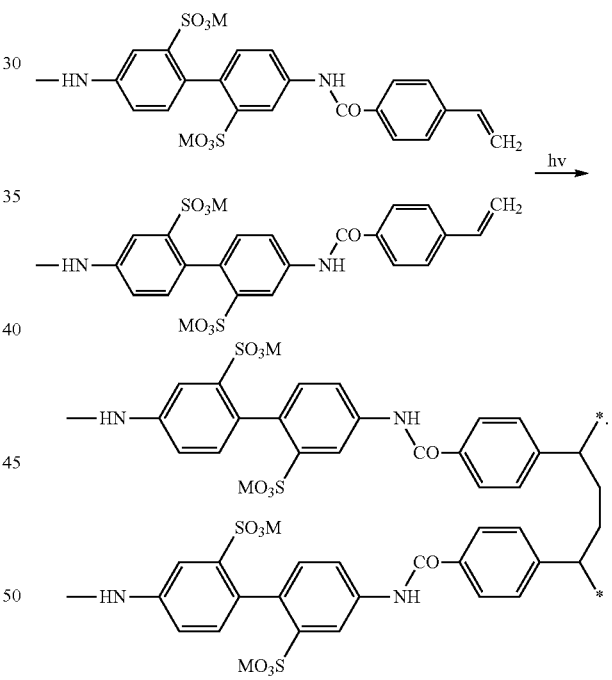

3. The method of claim 1, wherein the cross-linking includes one or more of the following processes: ultraviolet (UV) light irradiation of the polymer, infrared (IR) light irradiation of the polymer, irradiating the polymer with an electron beam, irradiating the polymer with an ion beam, and irradiating the polymer with a gamma beam.

4. A method of forming an optical element, the method comprising:
providing a substrate;
depositing a layer of polymer solution on at least one surface of the substrate, wherein the polymer comprises a plurality of copolymer molecules each copolymer molecule having organic units having the following structural formulas:

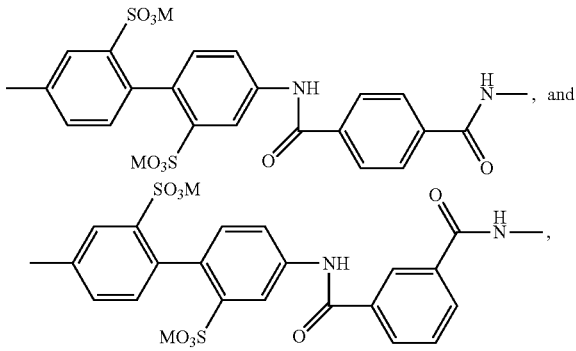

wherein M is a counterion;
cross-linking two or more of the copolymer molecules using one or more of the following techniques: UV light irradiation, IR light irradiation, electron beam irradiation, ion beam irradiation, and gamma beam radiating irradiation; and
evaporating a solvent from the polymer solution.

5. The method of claim 3, wherein the crosslinking includes ultraviolet (UV) light irradiation of the polymer, and wherein the cross-linking creates at least one bond between two or more copolymer molecules.

6. The method of claim 3, wherein the crosslinking includes ultraviolet (UV) light irradiation of the polymer, and wherein the ultraviolent (UV) light has a wavelength of between about 180 nanometers and 400 nanometers.

7. The method of claim 6, wherein the crosslinking includes ultraviolet (UV) light irradiation of the polymer, and wherein the cross-linking creates at least one bond between two or more copolymer molecules.

8. The method of claim 4, wherein the crosslinking includes ultraviolet (UV) light irradiation of the polymer, and wherein the ultraviolent (UV) light has a wavelength of between about 180 nanometers and 400 nanometers.

9. The method of claim 1, wherein M is a counterion selected from the group consisting of $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Al^{3+}$, $Ce^{3+}$, $Y^{3+}$, $Yb^{3+}$, $Gd^{3+}$, $Zr^{4+}$, and $NH_{4-p}Q_p$, where Q is a linear or branched (C1-C20) alkyl, (C2-C20) alkenyl, (C2-C20) alkynyl, or (C6-C20) arylalkyl, and p is 0, 1, 2, 3, or 4.

10. The method of claim 4, wherein M is a counterion selected from the group consisting of $H^+$, $Na^+$, $K^+$, $Li^+$, $Cs^+$, $Ba^{2+}$, $Ca^{2+}$, $Mg^{2+}$, $Sr^{2+}$, $Pb^{2+}$, $Zn^{2+}$, $La^{3+}$, $Al^{3+}$, $Ce^{3+}$, $Y^{3+}$, $Yb^{3+}$, $Gd^{3+}$, $Zr^{4+}$, and $NH_{4-p}Q_p$, where Q is a linear or branched (C1-C20) alkyl, (C2-C20) alkenyl, (C2-C20) alkynyl, or (C6-C20) arylalkyl, and p is 0, 1, 2, 3, or 4.

* * * * *